(12) United States Patent
Hufton et al.

(10) Patent No.: US 6,328,945 B1
(45) Date of Patent: *Dec. 11, 2001

(54) INTEGRATED STEAM METHANE REFORMING PROCESS FOR PRODUCING CARBON MONOXIDE

(75) Inventors: Jeffrey Raymond Hufton, Fogelsville; Shivaji Sircar, Wescosville; William Frederick Baade, Breinigsville; Joseph Michael Abrardo, Schnecksville; Madhu Anand, Allentown, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/624,148

(22) Filed: Apr. 8, 1996

Related U.S. Application Data

(63) Continuation-in-part of application No. 08/419,317, filed on Apr. 10, 1995.

(51) Int. Cl.[7] .............................. C01B 31/18; C01B 3/38
(52) U.S. Cl. ...................... 423/418.2; 423/652; 423/654
(58) Field of Search .................. 95/97; 423/418.2, 423/437 M, 651, 652, 653, 654, 655, 656, 659

(56) References Cited

U.S. PATENT DOCUMENTS

| | | | | |
|---|---|---|---|---|
| 4,491,573 | * | 1/1985 | Stonner et al. | 423/656 |
| 5,256,172 | * | 10/1993 | Keefer | 423/230 |
| 5,449,696 | * | 9/1995 | Dandekar et al. | 518/706 |

* cited by examiner

Primary Examiner—Stuart L. Hendrickson
(74) Attorney, Agent, or Firm—Keith D. Gourley

(57) ABSTRACT

A process for producing carbon monoxide (CO) by reforming methane and steam in the presence of a reforming catalyst to produce a reformate product enriched in CO, carbon dioxide ($CO_2$) and hydrogen. $CO_2$ in the enriched reformate is shifted to CO in an integrated sorption enhanced reaction (SER) cycle which employs a series of cyclic steps to facilitate reaction of $CO_2$ and hydrogen at high conversion and to produce a CO-enriched product obtained at reactor feed pressure and at essentially constant flow rate. A series of adsorbent regeneration step including depressurization, purging and product pressurization are used to desorb water which is selectively adsorbed by the adsorbent during the shift reaction and to prepare the reactor for a subsequent process cycle.

19 Claims, 9 Drawing Sheets

INTEGRATED STEAM METHANE REFORMING PROCESS FOR PRODUCING CARBON MONOXIDE

CROSS-REFERENCE TO RELATED APPLICATIONS

This application is a continuation-in-part to copending U.S. patent application Ser. No. 08/419,317, filed Apr. 10, 1995, the Specification and claims which are incorporated by reference and made a part of this application.

TECHNICAL FIELD OF THE INVENTION

The present invention is a process for producing carbon monoxide (CO) by reforming methane and steam in the presence of a reforming catalyst to produce a reformate product enriched in CO, carbon dioxide and hydrogen. Carbon dioxide ($CO_2$) in the enriched reformate is shifted to CO in an integrated sorption enhanced reaction (SER) cycle which employs a series of cyclic steps to perform the reverse water gas shift reaction to convert $CO_2$ to CO, to partially separate the shift reaction product mixture to recover an enriched CO stream and to prepare the SER reactors for a subsequent SER process cycle.

BACKGROUND OF THE INVENTION

Carbon monoxide is typically produced by catalytically reforming a hydrocarbon feed with steam, and optionally, carbon dioxide, at high temperatures. The reaction occurs in a steam methane reformer (SMR) which contains catalyst-filled tubes housed in a furnace. The synthesis gas exiting the reformer contains carbon monoxide (CO) along with hydrogen, carbon dioxide ($CO_2$), steam and unconverted methane according to the equilibria established in the following reactions:

$CH_4 + H_2O \rightleftharpoons 3H_2 + CO$ Steam Reforming

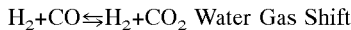
$H_2 + CO \rightleftharpoons H_2 + CO_2$ Water Gas Shift

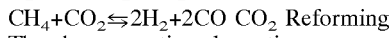
$CH_4 + CO_2 \rightleftharpoons 2H_2 + 2CO$ $CO_2$ Reforming

The above-mentioned reactions are generally carried out at high temperatures (800°–1000° C.) and at high pressures (5–30 atmospheres) wherein the reactants are contacted with a nickel based catalyst. These reactions are thermodynamically controlled. Therefore, the reformate effluent composition shall depend on many variables including pressure, temperature, molar ratio of steam/methane in the reactor feed and carbon dioxide concentration in the reactor feed. A typical SMR effluent composition (mole fractions) possesses 73% $H_2$, 13% CO, 8.5% $CO_2$ and 5.5% $CH_4$ when the SMR reaction is conducted at 850° C. and 25 atmospheres using a $CO_2$-free feed mixture containing a 3:1 water/methane molar ratio. The SMR effluent is subjected to a series of reaction and separation operations in order to recover a high purity $H_2$ product (99.9+mole %) or a high purity CO product (99.5+mole %).

Carbon monoxide provided in commercial SMR Plants is typically used to manufacture isocyanates and polycarbonates through phosgene chemistry. Alternatively, certain processes for producing oxoalcohols require a synthesis gas having a 1:1 ratio of hydrogen to carbon monoxide. By-product hydrogen and export steam formed during such SMR processes may have fuel value, but may not be required as products.

As is well known in the industry, synthesis gas having a high CO content is produced by injecting $CO_2$ into the reformer feedstock and by reducing the ratio of steam to hydrocarbon in the SMR feedstock. The SMR feedstock can be further enriched in $CO_2$ by recycling $CO_2$ produced and separated from the synthesis gas or recovered from the furnace flue gas or by importing additional $CO_2$ into the feedstock from an outside source. SMR feedstocks having a high $CO_2$ to methane ratio and reduced amounts of steam inhibit the water gas shift reaction from producing additional $H_2$ from CO and will reverse this reaction to produce additional CO from $H_2$ under extreme reaction conditions. Some $CO_2$ also reacts with methane in the SMR feedstock to yield syngas having a low $H_2/CO$ ratio.

The amount of CO produced in conventional SMR processes is limited by reaction thermodynamics wherein a relatively low conversion to CO (~10–15%) necessitates a significant separation effort to recover the desired CO product. Numerous prior art SMR processes for producing synthesis gas are known which utilize a variety of separation cycles to recover the desired CO product from the SMR reformate effluent which typically contains a mixture hydrogen, CO, $CO_2$ and methane.

U.S. Pat. No. 3,986,849 discloses a SMR process for converting water and a source of methane, such as natural gas, to a hydrogen product as depicted in FIG. 1. Methane and water are introduced through line 1 into a conventional SMR reactor 2 and reacted under reforming conditions to produce a $H_2$-enriched reformate stream 3. Stream 3 is introduced into condenser 4 to yield steam and cooled reformate stream 6 at an intermediate temperature of 250°–350° C. The cooled reformate is then fed into water-gas shift reactor 7 (high temperature shift reactor, alone or in combination with a low temperature shift reactor) to convert a portion of the CO in reformate stream 6 to hydrogen by reacting CO with $H_2O$ according to the reaction ($CO + H_2O \rightleftharpoons CO_2 + H_2$).

The above-mentioned shift reaction plays a key role in the over-all process when hydrogen is the desired product because the shift reaction increases the hydrogen concentration and quantity in the reformate product mixture prior to separating the reformate product mixture to produce essentially pure hydrogen. Shift reactor effluent 8 is further cooled to a near ambient temperature (25°–50° C.) by indirect heat exchange with cooling water in condenser 9 wherein a substantial amount of water is condensed and removed from the reformate via line 10. Finally, stream 11 exiting the condenser is introduced into a hydrogen pressure swing adsorption unit ($H_2$-PSA) to yield essentially pure hydrogen via stream 14 and a waste gas stream 13 which can be used as fuel in the reformer.

U.S. Pat. No. 4,171,206 discloses a SMR process for converting water and a source of methane such as natural gas to simultaneously yield a high purity hydrogen product and a high purity $CO_2$ product as depicted in FIG. 2. Methane and water are introduced through line 21 into a conventional SMR reactor 22 and reacted under reforming conditions to produce a reformate stream 23.

Stream 23 is introduced into condenser 24 to yield cooled reformate stream 26 at an intermediate temperature of 250–350° C. and condensate stream (not numbered). The cooled reformate is then fed into water-gas shift reactor 27 to convert a portion of the CO in reformate stream 26 to hydrogen. Shift reactor effluent 28 is further cooled to a near ambient temperature (25–50° C.) by indirect heat exchange with cooling water in condenser 29 wherein a substantial amount of water is condensed and removed from the reformate via line 30. Finally, reformate stream 31 exiting condenser 29 is introduced into $CO_2$ vacuum swing adsorption (VSA) unit 32 wherein the reformate is separated to provide an essentially pure $CO_2$ product stream 35. The waste gas from $CO_2$ VSA unit 32 is introduced into $H_2$-PSA unit 38 via line 34 and is separated to yield an essentially pure hydrogen stream 37 and waste gas stream 36 which can be used as fuel in reformer 22. The $CO_2$ VSA unit 32 and $H_2$ PSA unit 36 are integrated to obtain maximum separation efficiency.

A conventional SMR process is depicted in FIG. 3 wherein water and a source of methane are introduced through line 41 into a conventional SMR reactor 42 and reacted under reforming conditions to produce a reformate stream 43. Stream 43 is introduced into a $CO_2$ absorber/stripper 44 which contains a physico-chemical solvent which removes $CO_2$ from the pre-cooled SMR effluent to provide stream 45 which contains essentially pure $CO_2$ and a $CO_2$-depleted reformate stream 46 which is introduced into thermal swing adsorption unit 47 to remove water and remaining $CO_2$ which is withdrawn from adsorption unit 47 via line 48. $CO_2$ and water depleted stream 49 is introduced into cryogenic cold box 50 to yield essentially pure hydrogen stream 51, essentially pure CO stream 53 and a waste stream 52 containing CO and unreacted methane which can be used as fuel in reformer 42.

Another conventional SMR process is depicted in FIG. 4 wherein water and a source of methane are introduced through line 61 into a conventional SMR reactor 62 and reacted under reforming conditions to produce a reformate stream 63. Stream 63 is introduced into a $CO_2$ absorber/stripper 64 which contains a physico-chemical solvent which removes $CO_2$ from the pre-cooled SMR effluent to provide a $CO_2$-enriched stream 65 which may be compressed via compressor 66 and reintroduced as $CO_2$ feed into SMR reactor 62 via line 67. $CO_2$ depleted reformate stream 68 exits TSA unit 69 via line 71 and is introduced into cryogenic cold box 72 to yield essentially pure hydrogen stream 73, essentially pure CO stream 75 and waste stream 74 containing CO and unreacted methane which can be used as fuel in reformer 62.

U.S. Pat. No. 4,915,711 discloses an SMR process as depicted in FIG. 5. A source of methane and water is introduced through line 81 into a conventional SMR reactor 82 and reacted under reforming conditions to produce a reformate stream 83. Alternately, a $CO_2$ stream can also be introduced into the reformer to increase CO production. Stream 83 is introduced into condenser 84 to yield water condensate steam 85 and cooled reformate stream 86 at an intermediate temperature of 30°–120° C. The cooled reformate is then fed into CO-VSA 87 wherein the reformate is separated to provide an essentially pure CO product stream 88 and waste gas stream 89 which can be used as fuel in reformer 82.

An alternate SMR process is depicted in FIG. 6 wherein a source of methane and water is introduced through line 91 into a conventional SMR reactor 92 and reacted under reforming conditions to produce a reformate stream 93. Stream 93 is introduced into condenser 94 to yield water condensate steam 95 and cooled reformate stream 96 at an intermediate temperature of 30°–120° C. The cooled reformate is then fed into CO-VSA 97 wherein the reformate is separated to provide an essentially pure $CO_2$ product stream 98 and waste gas stream 99 is further processed by passing CO-VSA waste gas through line 99 into a conventional polymer membrane 100 to provide waste gas stream 101 which can be used as fuel in the reformer and $CO_2$-enriched stream 102 which is compressed by compressor 103 and introduced into SMR reactor 92 via line 104 as additional feedstock.

Another alternate SMR process for producing essentially pure CO and essentially pure hydrogen is depicted in FIG. 7. A source of methane and water is introduced through line 111 into a conventional SMR reactor 112 and reacted under reforming conditions to produce a reformate stream 113. Stream 113 is introduced into condenser 114 to yield cooled reformate stream 116 which is fed into water-gas shift reactor 117 to convert a portion of the CO and water in reformate stream 116 to hydrogen. The hydrogen-enriched reformate 127 is passed through condenser 128 to remove water and water-depleted stream 129 is passed into H2-PSA unit 130 to provide waste stream 132 which can be used as fuel in reformer 112 and an essentially pure hydrogen stream 131. A portion of the reformate can be caused to flow into line 118 upon opening valve 117a. Such reformate is passed into condenser 119 to cool the gas and to remove water prior to being transferred by line 121 into CO-VSA 122 wherein the reformate is separated to provide an essentially pure CO stream 123 and a CO-depleted stream 124 which is optionally compressed by compressor or blower 125 and passed through line 126 to be combined with line 129 as passage into $H_2$-PSA 130.

Those of ordinary skill in the art of steam methane reforming are searching for improved reforming processes wherein conversion to the desired CO product is maximized. Moreover, a process which facilitates the reaction of $CO_2$ and hydrogen to form CO and water [reverse water gas shift reaction] would be highly desirable. Unfortunately, no prior art SMR process integrations are known in the art for converting $CO_2$ and hydrogen present in the SMR reformate stream to CO and water. The reverse water gas shift reaction is thermodynamically unfavorable at temperatures below 800° C. and temperatures typically in excess of 1000° C. are required in order to obtain moderate $CO_2$ conversion to CO. Thus, the reverse water gas shift reaction has not been successfully integrated into a SMR process for producing CO.

Moreover, prior art processes for conducting simultaneous reaction and adsorption steps have not achieved commercial success because product flow rates do not remain sufficiently constant and the desired products are present in unacceptably low concentrations with respect to the undesired reaction products, unreacted feedstock and purge fluids. Industry is searching for ways to improve the general SMR process for producing CO by increasing overall process productivity or by increasing the CO mole fraction of the product mixture being fed into the subsequent separation unit feed stream.

BRIEF SUMMARY OF THE INVENTION

The present invention is a process for producing carbon monoxide (CO) by reforming methane and steam in the presence of a reforming catalyst to produce a reformate which is enriched in CO, carbon dioxide ($CO_2$) and hydrogen. $CO_2$ in the enriched reformate is shifted to CO in an integrated sorption enhanced reaction (SER) cycle which employs a series of cyclic steps performed in a plurality of reactors to effect a shift reaction to convert $CO_2$ to CO, a separation of the shift reaction product mixture to form a CO-enriched product stream and to prepare the SER reactors for a subsequent SER process cycle.

The claimed process overcomes problems associated with prior art processes for reforming methane and water to carbon monoxide which typically suffer from producing a reformate which contains an inordinate amount of $CO_2$ which is not converted to the desired CO product and which must be separated from the reformate by a costly separation cycle. Moreover, the claimed process overcomes problems associated with the thermodynamic limitations associated with the reverse water gas shift reaction wherein $CO_2$ and Hydrogen are converted to CO and water.

Applicants' invention solves these problems by converting carbon dioxide present in the reactor reformate to additional CO prior to separating the desired CO from the reactor reformate thereby substantially reducing costs associated with the separation cycle. This technical advance is made possible by utilizing a sorption enhanced reaction (SER) cycle which permits the reverse water gas shift reaction to be carried out with high conversion of $CO_2$ to CO at a moderate temperature of 250–350° C. and at a pressure of 5–30 atmospheres.

Applicants' process integrates an SER process a series of cyclic steps performed in a plurality of reactors to shift $CO_2$ to CO and to separate the shift gas product mixture into an enriched CO stream. Each reactor contains an admixture of a shift catalyst and a water adsorbent wherein water is selectively removed from the reaction zone by physical adsorption under shift reaction conditions thereby shifting the reaction equilibrium toward formation of desirable CO. The adsorbed water is separated from the adsorbent by utilizing a series of purge and depressurization steps which are performed according to a predetermined timed sequence. Thus, Applicants' SER process which is integrated into the claimed process represents an entirely new cycle for simultaneously obtaining high conversion of $CO_2$ to CO, for producing an enriched CO effluent stream, for efficiently desorbing water from the adsorbent and for preparing each reactor for the next process cycle.

Applicants' claimed process which integrates an SER cycle provides a unique opportunity to react $CO_2$ and hydrogen present in the SMR effluent to form additional CO prior to performing any process separation steps. The size of the separation unit is substantially reduced because the CO product is present in high concentration and a substantial portion of the $CO_2$ which would typically be removed during the separation steps of conventional SMR processes has been converted to the desired product, CO.

The general embodiment of Applicants' process for producing CO contemplates reacting a feedstock comprising methane and water in the presence of a steam-methane reforming catalyst at a temperature ranging from 700° C. to 1000° C. and a pressure ranging from 2 to 50 atmospheres to form a reformate comprising hydrogen, carbon monoxide, carbon dioxide and unreacted feedstock.

The second step of the general embodiment contemplates removing water from the reformate to form a water-depleted reformate and heating the water-depleted reformate to a temperature ranging from 200° to 500° C. to form a heated water-depleted reformate. The third step of the general embodiment comprises introducing the heated water-depleted reformate into a plurality of reactors operated in a predetermined timed sequence according to the following steps which are performed in a cycle within each reactor:

(1) reacting the heated water-depleted reformate at a first pressure in a first reactor containing an admixture of a water adsorbent and a water gas shift catalyst under reaction conditions sufficient to convert carbon dioxide and hydrogen to carbon monoxide and to adsorb water onto the adsorbent. A CO-enriched stream is withdrawn from the reactor as product.

(2) countercurrently depressurizing the first reactor to a second pressure by withdrawing a mixture comprising unreacted feedstock, carbon monoxide and water;

(3) countercurrently purging the first reactor at the second pressure with a weakly adsorbing purge fluid with respect to the adsorbent to desorb water from the adsorbent and withdrawing a mixture comprising unreacted feedstock, carbon monoxide and water;

(4) countercurrently purging the first reactor at the second pressure with a CO-enriched purge fluid which does not comprise hydrogen and carbon dioxide to desorb the weakly adsorbing purge fluid and withdrawing a mixture comprising the weakly adsorbing purge fluid, carbon monoxide and water; and (5) countercurrently pressurizing the first reactor from the second pressure to the first pressure with the CO-enriched purge fluid prior to commencing another process cycle within the first reactor.

Additional steps may be performed under the general embodiment. For example, the CO-enriched stream of step (1) can be separated using conventional techniques to form a stream comprising CO and a CO-depleted stream. This CO-depleted stream can be separated to form a hydrogen-enriched waste gas stream and a hydrogen depleted, carbon dioxide enriched recycle stream wherein a portion of the recycle stream can be recycled to the reformer. Alternately, the first reactor can be countercurrently purged at the first pressure with a weakly adsorbing purge fluid following step (1) and prior to performing step (2) wherein a mixture comprising unreacted feedstock, carbon monoxide and water is withdrawn from the reactor. This mixture can be recycled as feed to the SER reactors. Finally, an additional source of carbon dioxide can be introduced into the heated water-depleted reformate stream prior to conducting steps (1) through (5).

An alternate embodiment of Applicants' process for producing CO and hydrogen contemplates reacting a feed stock comprising methane and water in the presence of a steam-methane reforming catalyst at a temperature ranging from 700° C. to 1000° C. and a pressure ranging from 2 to 50 atmospheres to form a reformate comprising hydrogen, carbon monoxide, carbon dioxide and unreacted feedstock.

The second step of the alternate embodiment contemplates cooling the reformate to a temperature ranging from 200° to 500° C. to form a cooled reformate and dividing the cooled reformate into a first stream and a second stream. The third step contemplates contacting the first stream with a water gas shift catalyst under reaction conditions sufficient to form a hydrogen-enriched first stream, cooling the hydrogen-enriched first stream to form a cooled hydrogen-enriched first stream and separating the cooled hydrogen enriched first stream to form a hydrogen product stream and a hydrogen-depleted stream.

The fourth step of the alternate embodiment contemplates removing water from the second stream to form a water-depleted second stream and heating the water-depleted second stream to a temperature ranging from 200° to 500° C. to form a heated water-depleted second stream. The fifth step of the alternate embodiment comprises introducing the heated water-depleted reformate into a plurality of reactors operated in a predetermined timed sequence according to the following steps which are performed in a cycle within each reactor:

(1) reacting the heated water-depleted second stream at a first pressure in a first reactor containing an admixture of a water adsorbent and a water gas shift catalyst under reaction conditions sufficient to convert carbon dioxide and hydrogen to carbon monoxide and to adsorb water onto the adsorbent and withdrawing a CO-enriched stream;

(2) countercurrently depressurizing the first reactor to a second pressure by withdrawing a mixture comprising unreacted feedstock, carbon monoxide and water;

(3) countercurrently purging the first reactor at the second pressure with a weakly adsorbing purge fluid with respect to the adsorbent to desorb water from the adsorbent and withdrawing a mixture comprising unreacted feedstock, carbon monoxide and water;

(4) countercurrently purging the first reactor at the second pressure with a CO-enriched purge fluid which does not comprise hydrogen and carbon dioxide to desorb the weakly adsorbing purge fluid and withdrawing a mixture comprising the weakly adsorbing purge fluid, carbon monoxide and water; and (5) countercurrently pressurizing the first reactor from the second pressure to the first pressure with the CO-enriched purge fluid prior to commencing another process cycle within the first reactor.

The sixth and final step of the process of the alternate embodiment contemplates separating the CO-enriched stream of step (1) to form a stream comprising CO and a CO-depleted stream, compressing the CO-depleted stream and combining the compressed CO-depleted stream with the cooled hydrogen enriched first stream of step c prior to separating the cooled hydrogen enriched first stream to form a hydrogen product stream and a hydrogen-depleted stream.

Additional steps may be performed under the alternate embodiment. For example, the first reactor can be countercurrently purged at the first pressure with a weakly adsorbing purge fluid following step (1) and prior to performing step (2) wherein a mixture comprising unreacted feedstock, carbon monoxide and water is withdrawn from the reactor.

Suitable catalysts for conducting the steam-methane reforming reaction according to the general and alternate embodiments include conventional steam-methane reforming and prereforming catalysts such as nickel-alumina, nickel-magnesium alumina and the noble metal catalysts.

As stated in the general and alternate embodiments, the SER cycle contemplates conducting the reverse water gas shift reaction within a plurality of reactors containing an admixture of a water adsorbent and a water gas shift catalyst. The admixture of the adsorbent and the catalyst typically comprises from 5% to 95% by weight of the adsorbent and from 95% to 5% by weight of the catalyst. Suitable water adsorbents include those selected from the group consisting of zeolites, alumina or silica gel. Suitable water gas shift catalysts include those selected from the group consisting of iron-chromium high temperature shift catalyst, copper/zinc oxide low temperature shift catalyst and copper/zinc oxide medium temperature shift catalyst.

As shall become more apparent upon reading the Detailed Description of the Invention, Applicants' process overcomes problems associated with prior art processes by utilizing a novel series of reaction, adsorption and desorption steps to convert $CO_2$ present in the SMR reformate to CO and to separate and collect CO in substantially enriched form under a relatively constant flow rate at feedstock pressure. This result is accomplished in part by Applicants' unexpected use of a reaction product, CO or an enriched CO stream, to purge the SER reactors and to pressurize the reactors to reaction pressure prior to commencing another SER cycle.

While one of ordinary skill in the art would expect that the purging and pressurizing of the SER reactor with a product of the reverse water gas shift reaction prior to commencing the reaction step would undesirably shift the equilibrium constant toward formation of $CO_2$ and hydrogen, Applicants have discovered that purging the SER reactors with product gas instead of $CO_2$ or hydrogen reactants or alternate purge fluid provides a highly efficient process wherein a CO-enriched stream can be collected at feedstock pressure at a relatively constant flow rate.

DETAILED DESCRIPTION OF THE INVENTION

Applicants will now discuss in greater detail their process for producing carbon monoxide (CO) which provides numerous benefits over prior art processes. Specifically, greater conversion of reformer feedstock to CO product is achieved; a more concentrated reaction product is obtained than could be achieved using a conventional SMR process which does not utilize Applicants' SER cycle, which shall be discussed in greater detail, and the claimed process can be operated at less stringent conditions than prior art processes because high conversion of $CO_2$ and hydrogen is obtained by removing a reaction product and not by increasing reactor temperature.

Figure 8:
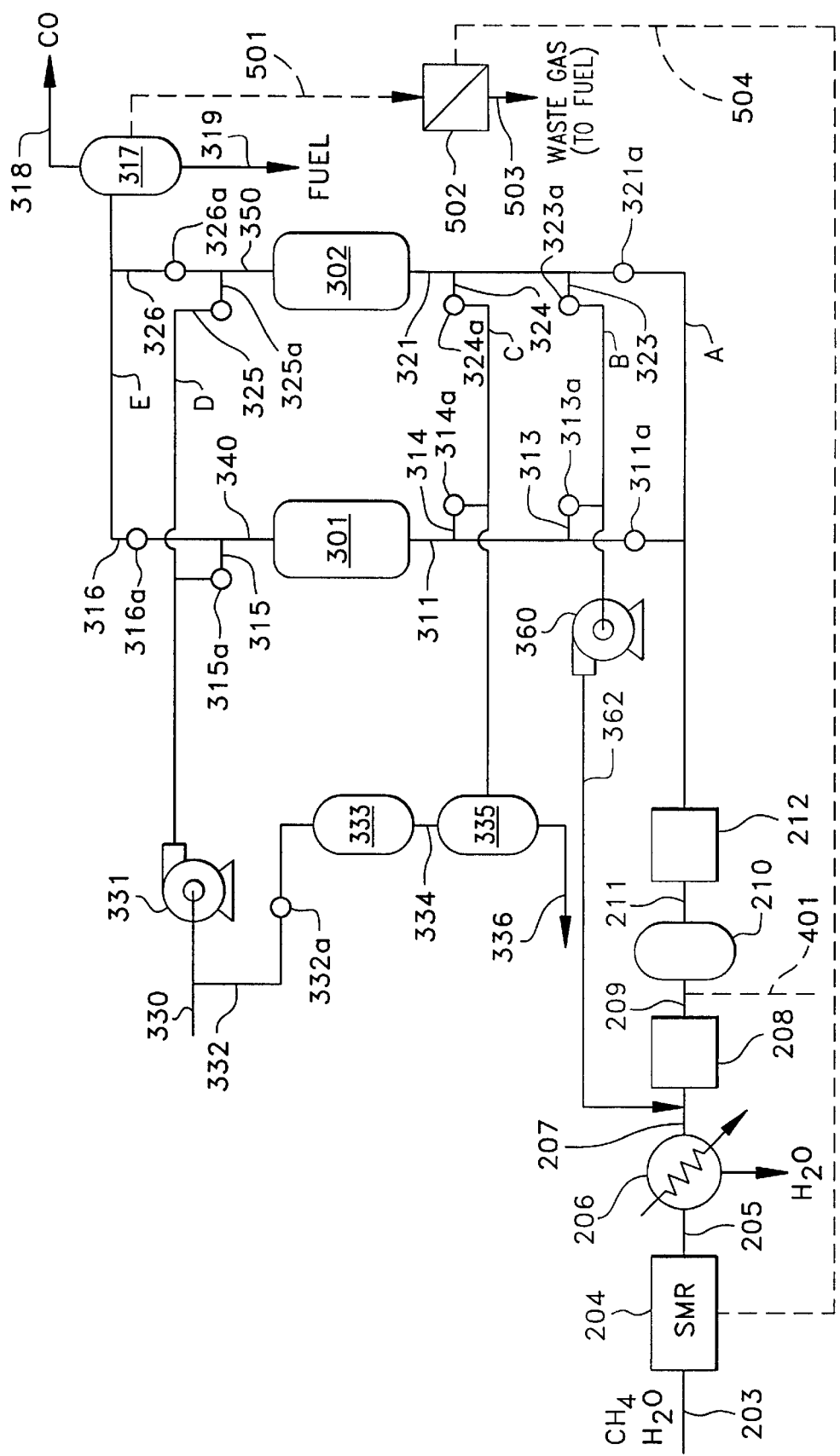
FIG. 8 illustrates a general embodiment of the claimed SMR process for making CO wherein methane and water are reacted in the presence of a catalyst to form a reformate product comprising carbon dioxide, carbon monoxide and hydrogen. The process integrates a sorption enhanced reaction (SER) cycle to further convert carbon dioxide formed in the SMR reactor to additional carbon monoxide and to remove water from the reaction mixture to further drive the equilibrium-controlled reaction toward formation of CO. The SER cycle employs a series of cyclic steps to perform a separation of the product mixture formed during the SER cycle and to prepare the SER reactors for a subsequent process cycle.

The general embodiment of Applicant's process is described in FIG. 8 which illustrates a process flow diagram which depicts a steam methane reformer 204, condenser 206, drier 208, feed heater 212, SER reactors 301 and 302; numerous control valves; manifolds A through E; pumps 331 and 360; separators 317 and 335; and surge vessels 210 and 333. Referring to FIG. 8, a hydrocarbon feedstock, e.g. methane or natural gas, is desulfurized in a vessel (not shown) using an adsorbent as is well known in the art The desulfurized hydrocarbon feedstock is mixed with steam to form a mixed reformer feedstock represented by stream 203. Feedstock 203 is preheated in a preheater (not shown) and introduced into SMR reformer 204. Such reformers are well known in the art and are heated by firing a mixture of fuel and air (not shown). The reformer typically operates at temperatures of 800° to 1000° C. and pressures of 5 to 30 atmosphere and produces a reformate consisting of about 73% hydrogen, 13% CO, 9% $CO_2$ and 5% methane on a dry basis. The reformate is sent through line 205 to a condenser 206 where the gas temperature is reduced and some of the water in the gas is removed by condensation. The gas travels to drier 208 via line 207 where the effluent is dried over a bed of water adsorbent. These drier units are well known in the industry and can be operated in a thermal or pressure swing mode. The dry gas is transferred through line 209 into surge vessel 210 (optional) wherein fluid is transferred through line 211 into heater 212 to form a heated water-depleted reformate stream which is routed into Manifold A. The remaining portion of FIG. 8 represents the SER process wherein the heated water-depleted reformate shall be subject to a shift reaction in a plurality of reactors operated in cycle to convert $CO_2$ and hydrogen in the reformate to CO and water via the reverse water gas shift reaction and to recover a CO-enriched product.

Manifold A is in flow communication with branch inlet lines 311 and 321 which are connected to the inlet ends of reactors 301 and 302. Lines 311 and 321 are equipped with valves 311a and 321a, respectively. Opening of the appropriate valve permits the pressurized heated water-depleted reformate to flow through manifold A into the selected reactor being initially placed on stream. Thus, by opening valve 311a, while valve 321a is closed, the reformate may be caused to flow from manifold A, through line 311 and into reactor 301.

Reactors 301 and 302 are fitted at their respective outlet ends with lines 340 and 350 respectively, each equipped with control valves 316a and 326a, respectively. Lines 340 and 350 are operatively connected to manifold E via lines 316 and 326 through which a CO-enriched stream withdrawn from reactors 301 and 302 can be collected in separator 317. Separator 317 can consist of any conventional separation system including a CO-VSA unit or a conventional distillation system. The high purity CO product can be collected via line 318 and residuals may be collected via line 319 for fuel value or recycle. Thus, by opening the appropriate valve 316a or 326a, the CO-enriched mixture is caused to flow from the corresponding reactor through lines 340 and 316 or lines 350 and 326 into manifold E for passage into separator 317.

Reactors 301 and 302 are operatively connected to lines 311 and 321, each of which is in flow communication with lines 313 and 323. Lines 313 and 323 are provided with control valves 313a and 323a, respectively, such lines being in flow communication with manifold B. Manifold B can be placed in flow communication with reactor 301 or 302 via lines 313 and 323 upon opening valve 313a or 323a, respectively. Manifold B is also in flow communication with pump 360 which is connected to line 362 which can be combined with stream 207.

Manifold C is in flow communication with reactors 301 and 302 via lines 314 and 324, each line which is equipped with valves 314a and 324a, respectively. Regeneration effluent from reactors 301 and 302 may be passed through lines 314 and 324 into manifold C for separation in separator 335 into stream 336 which is a water-enriched product stream and stream 334 comprising weakly adsorbing purge fluid which can be passed into storage tank 333 (optional) for later use.

Manifold D is connected to pump 331 which receives various process fluids via lines 330 and 332. Such process fluids pass through line 330 or line 332 and are pressurized via pump 331. The pressurized fluids may be passed through manifold D which is in flow communication with reactors 301 and 302 via lines 315 and 325, respectively. Lines 315 and 325 are each fitted with valves 315a and 325a such that the flow of streams from Manifold D into reactors 301 and 302 can be controlled. Moreover, weakly adsorbing purge fluid can be transferred to pump 331 via line 332 by opening valve 332a or by importing weakly adsorbing purge fluid via line 330.

Operation of the SER cycle of the several embodiments represented in FIG. 8 will now be explained in connection with an arbitrarily chosen cycle having eight timed periods of ten minutes per period as set forth in Table 1. Although not limited thereto, the SER process as illustrated in FIG. 8 utilizes reactors 301 and 302 which are operated in cycle according to a predetermined timed sequence. Other arrangements using fewer or a greater number of reactors and the associated gas manifolds and switch valves may be employed, optionally using interrupted or discontinuous operation (using idling) of pumps. Other arrangements using more than two reactors may be employed by appropriate sequencing of the individual steps or periods of the process cycle.

According to the general embodiment of FIG. 8, each of the reactors 301 and 302 undergo four periods of the reaction/adsorption step, referred to as the sorpreaction step, one period of the depressurization step, one period of the Purge I step, one period of the Purge II step, and one period of the pressurization step. As illustrated in Table 1, the steps undertaken at startup in each of reactors 301 and 302 are staggered to enable at least one of the two reactors to undergo the sorpreaction step at all times during the process cycle. The operation of the invention described in FIG. 8 involves principally the following sequence of steps: In applying the following steps, the first pressure ranges from 2 atmospheres to 50 atmospheres and the second pressure ranges from 0.05 to 2 atmospheres.

sents that a specified valve is closed. The operative sequence of steps occurring in reactor 301 during a complete process cycle will now be described in exhaustive detail so that operation of a continuous process will be fully understood. The identical sequence of steps according to Table 1 occurs in staggered sequence in reactor 302.

Again, referring to the embodiment disclosed in FIG. 8 and the sequence periods and valve positions designated in Table 1, reactor 301 undergoes four sequence periods of the sorpreaction step. Feedstock stored in storage tank 210 (optional), is introduced into reactor 301 by opening valves 311$a$ and 316$a$ and closing valves 313$a$, 314$a$ and 315$a$

TABLE 1

| Steps | Time Minutes | 311a | 313a | 314a | 315a | 316a | 332a | 321a | 323a | 324a | 325a | 326a | 332a | Steps ReactorSorber II |
|---|---|---|---|---|---|---|---|---|---|---|---|---|---|---|
| Sorpreaction | 0 to 10 | O | C | C | C | O | C | C | O | C | C | C | C | Depressurize |
| Sorpreaction | 10 to 20 | O | C | C | C | O | C | C | C | O | O | C | C | Purge I |
| Sorpreaction | 20 to 30 | O | C | C | C | O | C | C | C | O | O | C | C | Purge II |
| Sorpreaction | 30 to 40 | O | C | C | C | O | C | C | C | C | O | C | C | Pressurize |
| Depressurize | 40 to 50 | C | O | C | C | C | C | O | C | C | C | O | C | Sorpreaction |
| Purge I | 50 to 60 | C | C | O | O | C | C | O | C | C | C | O | C | Sorpreaction |
| Purge II | 60 to 70 | C | C | O | O | C | C | O | C | C | C | O | C | Sorpreaction |
| Pressurize | 70 to 80 | C | C | C | O | C | C | O | C | C | C | O | C | Sorpreaction |

(a) SORPREACTION—the heated water depleted reformate (feedstock) at a first predetermined pressure is passed through the reactor containing an admixture of shift catalyst and adsorbent preferentially selective toward water wherein a CO-enriched stream is withdrawn from the reactor. Water is selectively adsorbed by the adsorbent and a reaction mass transfer zone (RMTZ) is formed inside the reactor which moves toward the outlet or discharge end of the reactor as more feedstock is passed through the reactor. The adsorbent at the leading edge of the RMTZ is essentially free of the adsorbed water while the trailing edge of the RMTZ is equilibrated with water at the local conditions. The sorpreaction step is continued until the adsorbent in the reactor is essentially saturated with water. In other words, the sorpreaction step ends once the adsorption RMTZ has reached the effluent end of the reactor or somewhat short of it. The CO-enriched stream is discharged from the reactor.

(b) DEPRESSURIZATION—the reactor is countercurrently depressurized to a second predetermined pressure by withdrawing a mixture comprising unreacted feedstock, CO and water. The depressurization step is continued until the reactor reaches the second predetermined pressure.

(c) PURGE I—the reactor is countercurrently purged at the second pressure with a weakly adsorbing purge fluid to desorb water from the adsorbent and a mixture comprising weakly adsorbing purge fluid, unreacted feedstock, a portion of CO and a portion of water is withdrawn from the reactor.

(d) PURGE II—the reactor is countercurrently purged at the second pressure with a CO-enriched purge fluid which does not contain $CO_2$ and hydrogen to desorb the weakly adsorbing purge fluid and a mixture comprising the weakly adsorbing purge fluid, CO and water is withdrawn from the reactor.

(e) PRESSURIZATION—the reactor is countercurrently pressurized from the second pressure to the first pressure with CO-enriched purge fluid prior to commencing another process cycle within the reactor.

The valve positions during the above-mentioned operating cycle are also set forth in Table 1. The designation "O" indicates that a specified valve is open while a "C" reprethereby allowing feedstock to flow through manifold A, line 311 and into reactor 301 which contains an admixture of a desired shift catalyst and a water-selective adsorbent.

The sorpreaction is continued until reactor 301 is essentially saturated with adsorbed water. Water is selectively adsorbed onto the adsorbent and a reaction mass transfer zone (RMTZ) is formed within reactor 301 which moves toward the discharge end of reactor 301 as more feedstock is passed. The sorpreaction is completed when the MTZ reaches the effluent end of the reactor or somewhat short of it by a predesigned set point.

A CO-enriched stream exits the discharge end of reactor 301 via lines 340 and 316 and flows into manifold E for collection in separator 317. Optionally, the mixture in separator 317 can be separated by conventional techniques such as pressure swing adsorption, vacuum swing adsorption, thermal swing adsorption or distillation or condensation to form a stream comprising essentially pure CO which is discharged from separator 317 via line 318 and the remainder of the components of the mixture are discharged via line 319.

The process proceeds with one period of the depressurization step wherein reactor 301 is countercurrently depressurized to a second predetermined pressure by withdrawing a mixture comprising unreacted feedstock, CO and water from the inlet end of reactor 301. Valve 313$a$ is opened while valves 311$a$ and 314$a$ remain closed allowing the mixture to be passed through lines 311 and 313 into manifold B and in flow communication with pump 360. The mixture exits the discharge end of pump 360 proceeding via line 362 for use as fuel (not shown) or recycle into line 207 for use as feedstock in a subsequent process cycle. The depressurization step is continued until the reactor reaches the second predetermined pressure.

Reactor 301 is then subjected to one period of the purge I step. Reactor 301 is countercurrently purged at the second pressure with weakly adsorbing purge fluid. Upon opening valves 314$a$ and 315$a$ while valves 325$a$ and 332$a$ remain in the closed position, weakly adsorbing purge fluid from an external source passes through pump 331 via line 330 and exits pump 331 at the second pressure to proceed via manifold D, line 315 and line 340 into the exit end of reactor 301. A mixture comprising weakly adsorbing purge fluid, unreacted feedstock, CO and water is withdrawn from reactor 301 via line 311, line 314 and manifold C and is collected in separator 335. This mixture may be used as fuel, discharged for use outside the process or separated in separator 335 to form a stream of weakly adsorbing purge gas and a water enriched stream 336. A portion of the weakly adsorbing purge fluid may be transferred through line 334 into storage tank 333 for future use. Upon demand via opening valve 332a, weakly adsorbing purge fluid may be drawn to pump 331 via lines 332 and 330 for use in subsequent process cycles.

Reactor 301 is then subjected to one period of the purge II step wherein reactor 301 is countercurrently purged with a CO-enriched fluid which does not contain both hydrogen and $CO_2$. Upon opening valves 314a and 315a while valves 325a and 332a remain in the closed position, the CO-enriched purge fluid from an external source passes through pump 331 via line 330 and exits pump 331 at the second pressure to proceed via manifold D, line 315 and line 340 into the exit end of reactor 301. A mixture comprising weakly adsorbing purge fluid, water and CO-enriched purge fluid is withdrawn from reactor 301 via line 311, line 314 and manifold C and is collected in separator 335. This mixture may be used as fuel or discharged for use outside the process.

The final step of the process cycle involves a single sequence of the pressurization step wherein reactor 301 is countercurrently pressurized from the second pressure to the first pressure with a CO-enriched purge fluid or high purity CO product stream 318 prior to commencing another process cycle within the reactor. Specifically, upon opening valve 315a while valves 311a, 313a, 314a, 325a and 332a remain in the closed position, the CO-enriched purge fluid passes through pump 331 via line 330 and exits pump 331 at the second pressure to proceed via manifold D, line 315 and line 340 into the exit end of reactor 301. This step is stopped when reactor 301 reaches the first pressure.

The process proceeds through additional cycles according to the abovementioned steps enumerated in Table 1. While the sequence periods are depicted as being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the reactor effluent.

Several variations to the general embodiment may be practiced to meet the particular needs of each plant. For example, the CO-enriched stream 317 of manifold E can be separated in separator 317 to form stream 318 comprising essentially pure CO and a CO-depleted stream 501. Stream 501 can be admitted to a conventional polymeric membrane 502 to form a hydrogen-enriched waste gas stream 503 and a hydrogen depleted, carbon dioxide enriched recycle stream 504 which may be recycled into SMR reactor 204.

Alternately, each reaction may be subjected to an additional countercurrent Purge step at the first pressure with a weakly adsorbing purge fluid between the sorpreaction step and the depressurization step and withdrawing a mixture comprising unreacted feedstock, CO and water which can be recycled as feed to the SER reactors via manifold B, pump 360 and line 362. Moreover, additional $CO_2$ may be added to the heated water-depleted reformate stream 209 prior to conducting the SER cycle in order to balance the $CO_2$ and hydrogen stoichiometry for the shift reaction.

Figure 9:
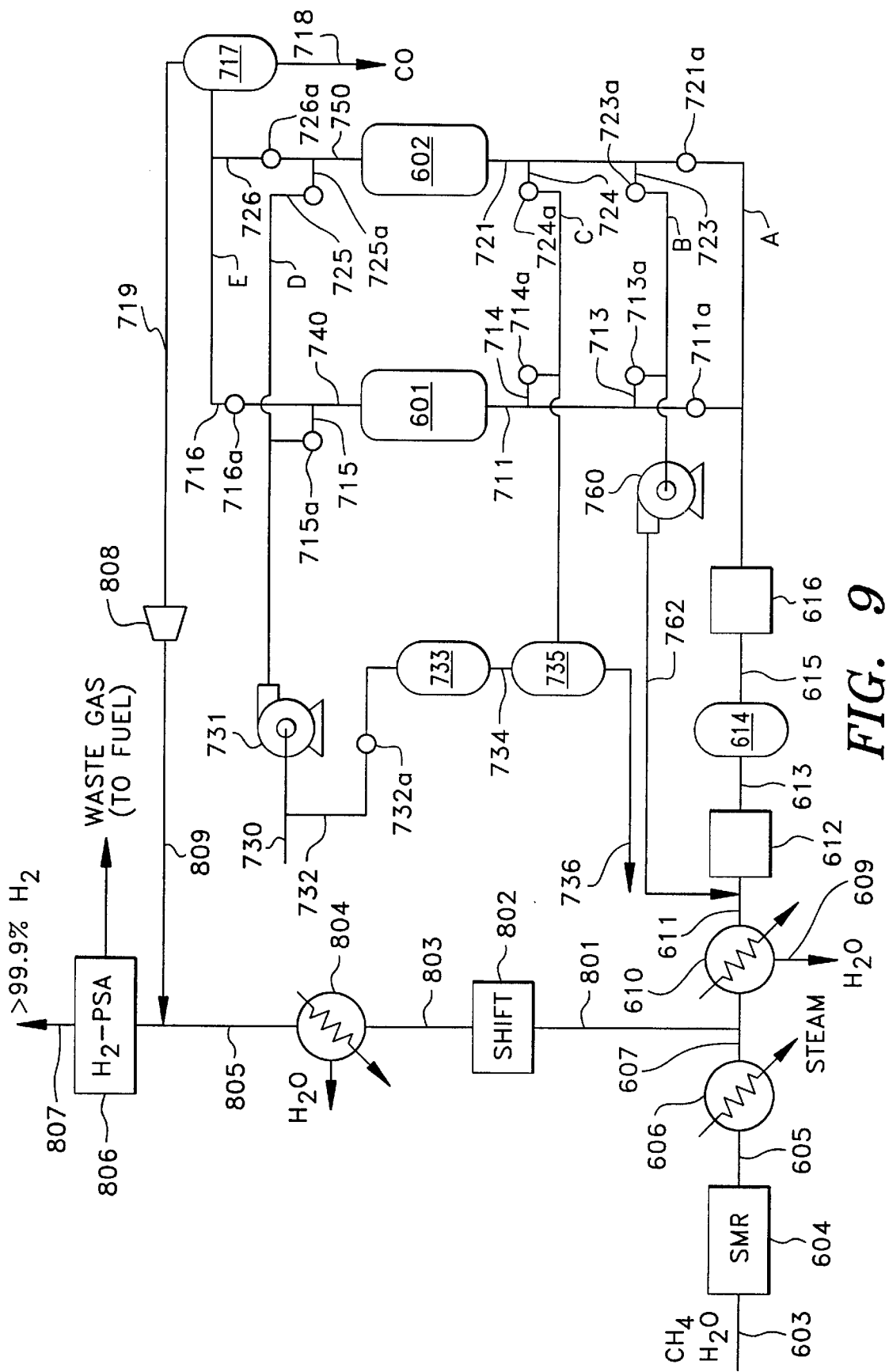
FIG. 9 illustrates an alternate embodiment of the claimed SMR process for making an essentially pure CO stream and an essentially pure hydrogen stream wherein methane and water are reacted in the presence of a catalyst to form a reformate product comprising carbon dioxide, carbon monoxide and hydrogen. The process integrates a high temperature shift reactor to enhance hydrogen production and a sorption enhanced reaction (SER) cycle to further convert carbon dioxide formed in the SMR reactor to additional carbon monoxide and to remove water from the reaction mixture to further drive the equilibrium-controlled reaction toward formation of CO. The SER cycle employs a series of cyclic steps to perform a separation of the product mixture formed during the SER cycle and to prepare the SER reactors for a subsequent process cycle.

The alternate embodiment of Applicant's process is described in FIG. 9 which illustrates a process flow diagram which depicts a steam methane reformer 604, shift reactor 802, hydrogen PSA unit 806, compressor 808, condensers 606, 610 and 804, drier 612, feed heater 616, SER reactors 601 and 602; numerous control valves; manifolds A through E; pumps 731 and 760; separators 717 and 735; and surge vessels 614 and 733. Referring to FIG. 9, a hydrocarbon feedstock, e.g. methane or natural gas, is desulfurized in a vessel (not shown) using an adsorbent as is well known in the art. The desulfurized hydrocarbon feedstock is mixed with steam to form a mixed reformer feedstock represented by stream 603. Feedstock 603 is preheated in a preheater (not shown) and introduced into SMR reformer 604. Such reformers are well known in the art and are heated by firing a mixture of fuel and air (not shown). The reformer typically operates at temperatures of 800° to 1000° C. and pressures of 5 to 30 atmospheres and produces a reformate consisting of about 73% hydrogen, 13% CO, 9% $CO_2$ and 5% methane on a dry basis. The reformate is sent through line 605 to a condenser 606 where the gas temperature is reduced to 200° to 500° C. The gas is split into a first stream which passes through line 801 and a second stream which passes through condenser 610. The cooled reformate passing through line 801 flows through a shift reactor 802 where CO and water are shifted to hydrogen. The hydrogen-enriched stream 803 exiting the shift reactor is cooled to 30° to 120° C. in condenser 804 wherein substantial water is removed by condensation. The water depleted, hydrogen enriched stream 805 is sent to the hydrogen PSA 806 to produce a high purity hydrogen stream 807 and a waste stream. The second stream entering condenser 610 is cooled to ambient temperature and water is removed by condensation. The gas travels to drier 612 via line 611 where the effluent is dried over a bed of water adsorbent. These drier units are well known in the industry and can be operated in a thermal or pressure swing mode. The essentially dry gas is transferred through line 613 into surge vessel 614 wherein fluid is transferred through line 615 into heater 616 to form a heated water-depleted reformate stream which is routed into Manifold A. The remaining portion of FIG. 9 represents the SER process wherein the heated water-depleted reformate shall be subject to a shift reaction in a plurality of reactors operated in cycle to convert $CO_2$ and hydrogen in the reformate to CO and water via the reverse water gas shift reaction and to recover a CO-enriched product.

Manifold A is in flow communication with branch inlet lines 711 and 721 which are connected to the inlet ends of reactors 601 and 602. Lines 711 and 721 are equipped with valves 711a and 721a, respectively. Opening of the appropriate valve permits the pressurized heated water-depleted reformate to flow through manifold A into the selected reactor being initially placed on stream. Thus, by opening valve 711a, while valve 721a is closed, the reformate may be caused to flow from manifold A, through line 711 and into reactor 601.

Reactors 601 and 602 are fitted at their respective outlet ends with lines 740 and 750 respectively, each equipped with control valves 716a and 726a, respectively. Lines 740 and 750 are operatively connected to manifold E via lines 716 and 726 through which a CO-enriched stream withdrawn from reactors 601 and 602 can be collected in separator 717. Separator 717 can consist of any conventional separation system including a CO-VSA unit or a conventional distillation system. The high purity CO product can be collected via line 718 and the CO-depleted stream 719 is optionally compressed in compressor or blower 808 and combined with line 805 which leads to the hydrogen PSA 806. Thus, by opening the appropriate valve 716a or 726a, the CO-enriched mixture is caused to flow from the corresponding reactor through lines 740 and 716 or lines 750 and 726 into manifold E for passage into separator 717.

Reactors 601 and 602 are operatively connected to lines 711 and 721, each of which is in flow communication with lines 713 and 723. Lines 713 and 723 are provided with control valves 713a and 723a, respectively, such lines being in flow communication with manifold B. Manifold B can be placed in flow communication with reactor 601 or 602 via lines 713 and 723 upon opening valve 713a or 723a, respectively. Manifold B is also in flow communication with pump 760 which is connected to line 762 which can be combined with stream 611.

Manifold C is in flow communication with reactors 601 and 602 via lines 714 and 724, each line which is equipped with valves 714a and 724a, respectively. Regeneration effluent from reactors 601 and 602 may be passed through lines 714 and 724 into manifold C for separation in separator 735 into stream 736 which is a water-enriched product stream and stream 734 comprising weakly adsorbing purge fluid which can be passed into storage tank 733 for later use.

Manifold D is connected to pump 731 which receives various process fluids via lines 730 and 732. Such process fluids pass through line 730 or line 732 and are pressurized via pump 731. The pressurized fluids may be passed through Manifold D which is in flow communication with reactors 601 and 602 via lines 715 and 725, respectively. Lines 715 and 725 are each fitted with valves 715a and 725a such that the flow of streams from Manifold D into reactors 601 and 602 can be controlled. Moreover, weakly adsorbing purge fluid can be transferred to pump 731 via line 732 by opening valve 732a or by importing weakly adsorbing purge fluid via line 730.

Operation of the SER cycle of the several embodiments represented in FIG. 9 will now be explained in connection with an arbitrarily chosen cycle having eight timed periods of ten minutes per period as set forth in Table 2. Although not limited thereto, the SER process as illustrated in FIG. 9 utilizes reactors 601 and 602 which are operated in cycle according to a predetermined timed sequence. Other arrangements using fewer or a greater number of reactors and the associated gas manifolds and switch valves may be employed, optionally using interrupted or discontinuous operation (using idling) of pumps. Other arrangements using more than two reactors may be employed by appropriate sequencing of the individual steps or periods of the process cycle.

undertaken at startup in each of reactors 601 and 602 are staggered to enable at least one of the two reactors to undergo the sorpreaction step at all times during the process cycle. The operation of the invention described in FIG. 9 involves principally the following sequence of steps: In applying the following steps, the first pressure ranges from 2 atmospheres to 50 atmospheres and the second pressure ranges from 0.05 to 2 atmospheres.

(a) SORPREACTION—the heated water depleted reformate (feedstock) at a first predetermined pressure is passed through the reactor containing an admixture of shift catalyst and adsorbent preferentially selective toward water wherein a CO-enriched stream is withdrawn from the reactor. Water is selectively adsorbed by the adsorbent and a reaction mass transfer zone (RMTZ) is formed inside the reactor which moves toward the outlet or discharge end of the reactor as more feedstock is passed through the reactor. The adsorbent at the leading edge of the RMTZ is essentially free of the adsorbed water while the trailing edge of the RMTZ is equilibrated with water at the local conditions. The sorpreaction step is continued until the adsorbent in the reactor is essentially saturated with water. In other words, the sorpreaction step ends once the adsorption RMTZ has reached the effluent end of the reactor or somewhat short of it. The CO-enriched stream is discharged from the reactor.

(b) DEPRESSURIZATION—the reactor is countercurrently depressurized to a second predetermined pressure by withdrawing a mixture comprising unreacted feedstock, CO and water. The depressurization step is continued until the reactor reaches the second predetermined pressure.

(c) PURGE I—the reactor is countercurrently purged at the second pressure with a weakly adsorbing purge fluid to desorb water from the adsorbent and a mixture comprising weakly adsorbing purge fluid, unreacted feedstock, a portion of CO and a portion of water is withdrawn from the reactor.

(d) PURGE II—the reactor is countercurrently purged at the second pressure with a CO-enriched purge fluid which does not contain $CO_2$ and hydrogen to desorb the weakly adsorbing purge fluid and a mixture comprising the weakly adsorbing purge fluid, CO and water is withdrawn from the reactor.

(e) PRESSURIZATION—the reactor is countercurrently pressurized from the second pressure to the first pressure with CO-enriched purge fluid prior to commencing another process cycle within the reactor.

TABLE 2

| Steps | Time Minutes | 711a | 712a | 713a | 714a | 715a | 716a | 732a | 721a | 722a | 723a | 724a | 725a | 726a | 732a | Steps Reactor Sorber II |
|---|---|---|---|---|---|---|---|---|---|---|---|---|---|---|---|---|
| Sorpreaction | 0 to 10 | O | C | C | C | C | O | C | C | O | C | C | O | C | C | Purge, Ph |
| Sorpreaction | 10 to 20 | O | C | C | C | C | O | C | C | C | O | C | C | C | C | Depressurize |
| Sorpreaction | 20 to 30 | O | C | C | C | C | O | C | C | C | C | O | O | C | C | Purge I, PI |
| Sorpreaction | 30 to 40 | O | C | C | C | C | O | C | C | C | C | O | O | C | C | Purge II, PI |
| Sorpreaction | 50 to 60 | O | C | C | C | C | O | C | C | C | C | C | O | C | C | Pressurize |
| Purge, Ph | 50 to 60 | C | O | C | C | O | C | C | O | C | C | C | C | O | C | Sorpreaction |
| Depressurize | 60 to 70 | C | C | O | C | C | C | C | O | C | C | C | C | O | C | Sorpreaction |
| Purge, PI | 70 to 80 | C | C | C | O | O | C | C | O | C | C | C | C | O | C | Sorpreaction |
| Purge II, PI | 80 to 90 | C | C | C | O | O | C | C | O | C | C | C | C | O | C | Sorpreaction |
| Pressurize | 90 to 100 | C | C | C | C | O | C | C | O | C | C | C | C | O | C | Sorpreaction |

According to the alternate embodiment of FIG. 9, each of the reactors 601 and 602 undergo four periods of the reaction/adsorption step, referred to as the sorpreaction step, one period of the depressurization step, one period of the Purge I step, one period of the Purge II step, and one period of the pressurization step. As illustrated in Table 2, the steps The valve positions during the above-mentioned operating cycle are also set forth in Table 2. The designation "O" indicates that a specified valve is open while a "C" represents that a specified valve is closed. The operative sequence of steps occurring in reactor 601 during a complete process cycle will now be described in exhaustive detail so that operation of a continuous process will be fully understood. The identical sequence of steps according to Table 2 occurs in staggered sequence in reactor 602.

Again, referring to the embodiment disclosed in FIG. 9 and the sequence periods and valve positions designated in Table 2, reactor 601 undergoes four sequence periods of the sorpreaction step. Feedstock stored in storage tank 614 is preheated in heater 616 and then introduced into reactor 601 by opening valves 711a and 716a and closing valves 713a, 714a and 715a thereby allowing feedstock to flow through manifold A, line 711 and into reactor 601 which contains an admixture of a desired shift catalyst and a water-selective adsorbent.

The sorpreaction is continued until reactor 601 is essentially saturated with adsorbed water. Water is selectively adsorbed onto the adsorbent and a reaction mass transfer zone (RMTZ) is formed within reactor 601 which moves toward the discharge end of reactor 601 as more feedstock is passed. The sorpreaction is completed when the MTZ reaches the effluent end of the reactor or somewhat short of it by a predesigned set point.

A CO-enriched stream exits the discharge end of reactor 601 via lines 740 and 716 and flows into manifold E for collection in separator 717. Optionally, the mixture in separator 717 can be separated by conventional techniques such as pressure swing adsorption, vacuum swing adsorption, thermal swing adsorption or distillation or condensation to form a stream comprising essentially pure CO which is discharged from separator 717 via line 718 and the remainder of the components of the mixture are discharged via line 719.

The process proceeds with one period of the depressurization step wherein reactor 601 is countercurrently depressurized to a second predetermined pressure by withdrawing a mixture comprising unreacted feedstock, CO and water from the inlet end of reactor 601. Valve 713a is opened while valves 711a and 714a remain closed allowing the mixture to be passed through lines 711 and 713 into manifold B and in flow communication with pump 760. The mixture exits the discharge end of pump 760 proceeding via line 762 for use as fuel (not shown) or recycle into line 611 for use as feedstock in a subsequent process cycle. The depressurization step is continued until the reactor reaches the second predetermined pressure.

Reactor 601 is then subjected to one period of the purge I step. Reactor 601 is countercurrently purged at the second pressure with weakly adsorbing purge fluid. Upon opening valves 714a and 715a while valves 725a and 732a remain in the closed position, weakly adsorbing purge fluid from an external source passes through pump 731 via line 730 and exits pump 731 at the second pressure to proceed via manifold D, line 715 and line 740 into the exit end of reactor 601. A mixture comprising weakly adsorbing purge fluid, unreacted feedstock, CO and water is withdrawn from reactor 601 via line 711, line 714 and manifold C and is collected in separator 735. This mixture may be used as fuel, discharged for use outside the process or separated in separator 735 to form a stream of weakly adsorbing purge gas and a water enriched stream 736. A portion of the weakly adsorbing purge fluid may be transferred through line 734 into storage tank 733 for future use. Upon demand via opening valve 732a, weakly adsorbing purge fluid may be drawn to pump 731 via lines 732 and 730 for use in subsequent process cycles.

Reactor 601 is then subjected to one period of the purge II step wherein reactor 601 is countercurrently purged with a CO-enriched fluid which does not contain both hydrogen and $CO_2$. Upon opening valves 714a and 715a while valves 725a and 732a remain in the closed position, the CO-enriched purge fluid from an external source passes through pump 731 via line 730 and exits pump 731 at the second pressure to proceed via manifold D, line 715 and line 740 into the exit end of reactor 601. A mixture comprising weakly adsorbing purge fluid, water and CO-enriched purge fluid is withdrawn from reactor 601 via line 711, line 714 and manifold C and is collected in separator 735. This mixture may be used as fuel or discharged for use outside the process.

The final step of the process cycle involves a single sequence of the pressurization step wherein reactor 601 is countercurrently pressurized from the second pressure to the first pressure with a CO-enriched purge fluid or high purity CO product stream 718 prior to commencing another process cycle within the reactor. Specifically, upon opening valve 715a while valves 711a, 713a, 714a, 725a and 732a remain in the closed position, the CO-enriched purge fluid passes through pump 731 via line 730 and exits pump 731 at the second pressure to proceed via manifold D, line 715 and line 740 into the exit end of reactor 601. This step is stopped when reactor 601 reaches the first pressure.

The process proceeds through additional cycles according to the above-mentioned steps enumerated in Table 2. While the sequence periods are depicted as being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the reactor effluent.

Alternately, each reaction may be subjected to an additional countercurrent Purge step at the first pressure with a weakly adsorbing purge fluid between the sorpreaction step and the depressurization step and withdrawing a mixture comprising unreacted feedstock, CO and water which can be recycled as feed to the SER reactors via manifold B, pump 760 and line 762.

Suitable catalysts for conducting the steam-methane reforming reaction include conventional steam-methane reforming and prereforming catalysts such as nickel-alumina, nickel-magnesium alumina and the noble metal catalysts.

Suitable water gas shift catalysts for conducting the reverse shift reaction in the reactors or the SER cycle include conventional shift catalysts such iron-chromium high temperature shift catalyst, copper-zinc oxide low temperature shift catalyst and copper/zinc oxide medium temperature shift catalyst.

Respecting the water adsorbents to be used in the reactors of the integrated SER process, the adsorbent must be active at the reaction conditions meaning that such the adsorbent must retain its capacity and selectivity for the more adsorbable product. Second, the adsorbent must be chemically neutral and must not act as a catalyst for the reverse water gas shift reaction.

The term, weakly adsorbing fluid, refers to a fluid which is capable of displacing the product which is adsorbed by the adsorbent during operation of the process and which can then be desorbed by the less adsorbing product such that subsequent process cycles can be conducted in each reactor. One of ordinary skill in the art can readily select one or a mixture of weakly adsorbing fluids suitable for use in the claimed invention.

The general and alternate embodiments of the present invention can be operated using conventional hardware. For example, suitable reactors include any vessel which is capable of being subjected to the reaction conditions required to practice a particular equilibrium controlled process such as shell and tube reactors. Moreover, the separators enumerated in the process are readily selected by one of ordinary skill in the art based upon considerations such as the particular mixtures to be separated, the volume of fluids to be separated and the like.

The following examples are provided to further illustrate Applicants' process for producing CO. The examples are illustrative and are not intended to limit the scope of the appended claims.

Experimental Section

The following examples are provided to further illustrate Applicants' claimed process for producing CO which integrates a conventional SMR process with an SER cycle which shifts $CO_2$ present in the SMR reformate to CO via the reverse water gas shift. The examples are illustrative and are not intended to limit the scope of the appended claims.

Figure 5:
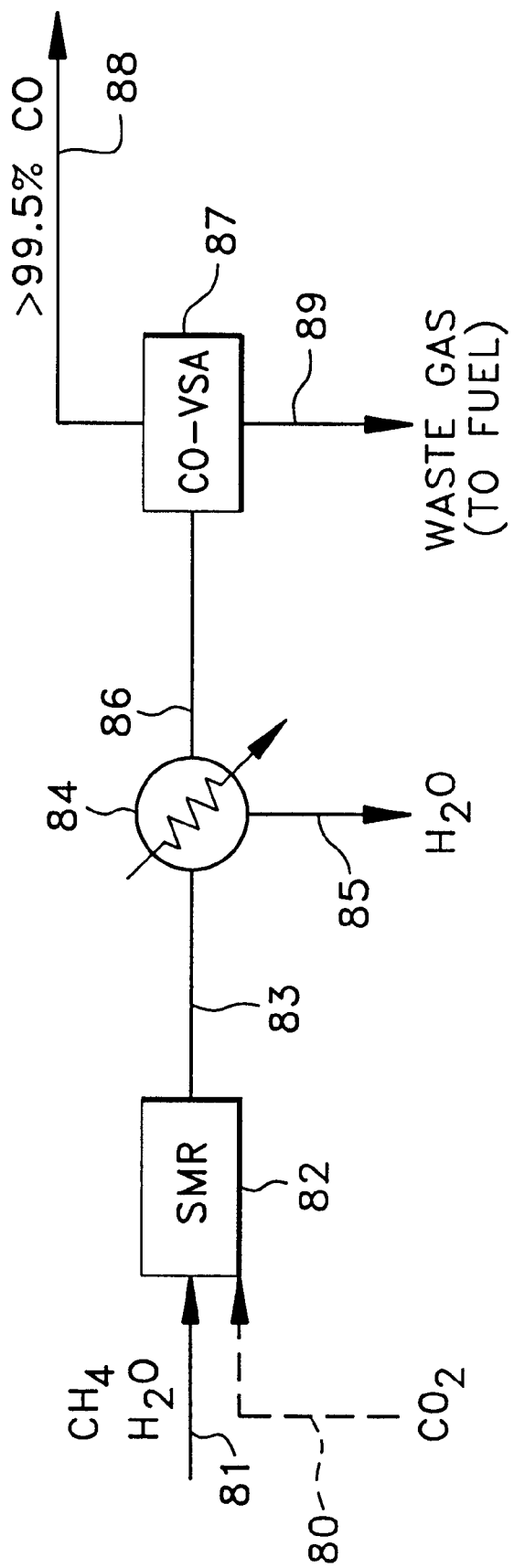
FIG. 5 illustrates a prior art SMR process for producing essentially pure CO wherein the SMR reformate is condensed to remove water prior to separating the reformate in a CO-VSA to provide an essentially pure CO product and a waste gas stream which can be recycled as fuel to the reformer.
Figure 6:
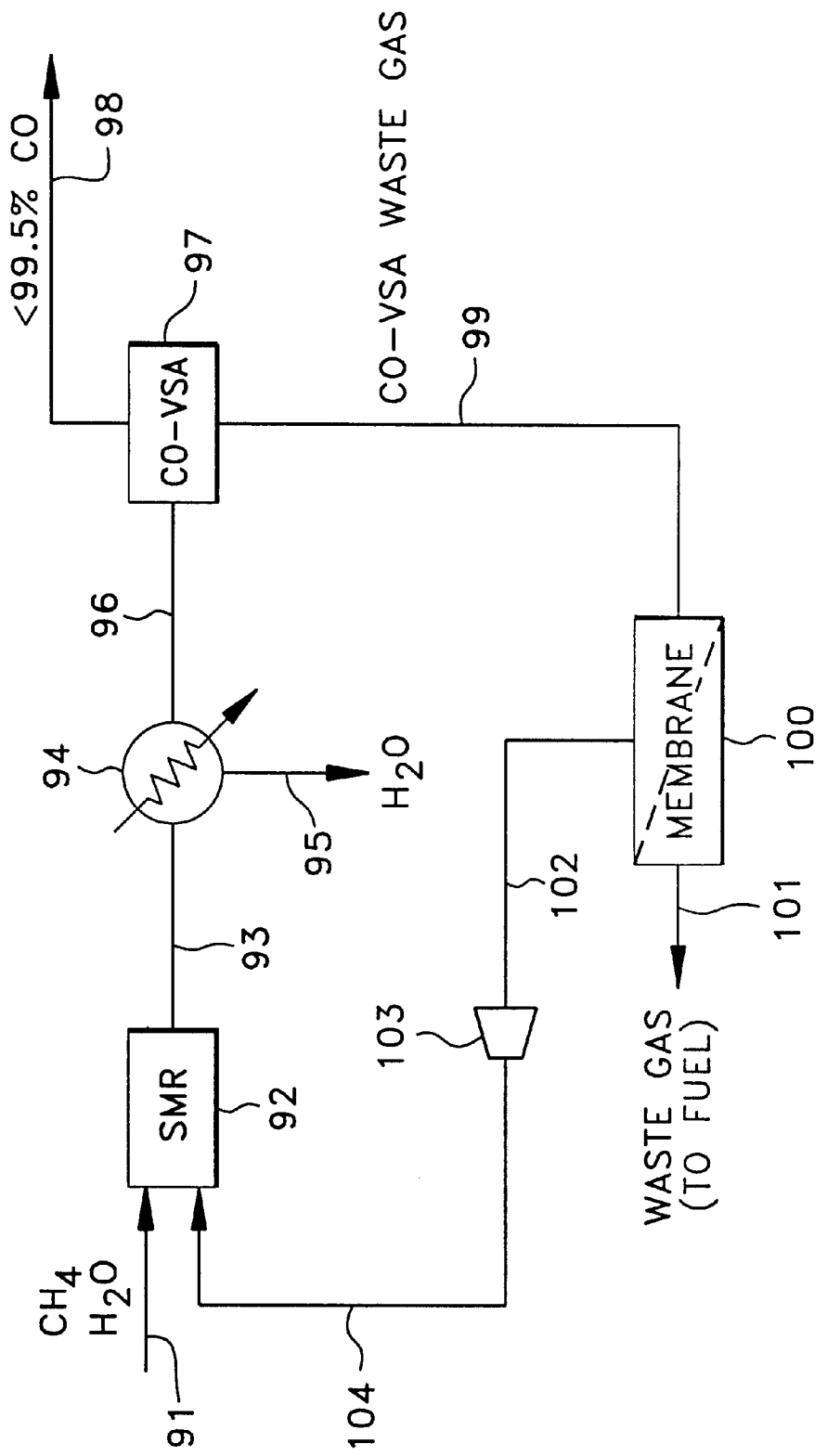
FIG. 6 illustrates a modified version of FIG. 5 wherein the waste gas stream recovered from the CO-VSA is contacted with a permselective polymeric membrane to provide a waste gas stream which can be recycled as fuel to the reformer and a $CO_2$-enriched stream which is compressed and reintroduced into the SMR reactor for further conversion to CO and hydrogen.

Mass balance calculations were carried out for selected processes depicted in FIGS. 1 through 7. Thermodynamic equilibrium calculations used to determine the steam methane reformer effluent composition were carried out using a software package entitled "HSC Chemistry for Windows", from Outokumpu Research Oy, Finland. All other calculations were within the ordinary pervue of one of ordinary skill in the art of chemical engineering. The following assumptions were utilized in making the calculations:

a) the reformate product composition is dictated by equilibrium conversion of the reformer products at constant temperature and pressure;

b) the steam methane reformer operates at 850° C. and 25 atmosphere pressure;

c) the feed stream to the reformer contains 25 moles/min of $CH_4$ and 75 moles/min of $H_2O$;

d) an additional feed stream of 60 moles/hr of $CO_2$ is added to the reformer or sorption enhanced reactor when the case of $CO_2$ import is considered (FIGS. 5, 8);

e) the CO-VSA process produces essentially pure CO product (99.5%) at 85% carbon monoxide recovery;

f) the H2-PSA process produces essentially pure H2 product (99.9%) at 85% hydrogen recovery;

g) the conversion of $CO_2$ to CO in the Sorption Enhanced Reactor Process is 80% (i.e., 80% of the $CO_2$ fed to the reactor is withdrawn as CO product from the reactor);

h) the membrane separator in FIGS. 6 and 8 rejects 30% of the feed hydrogen, 67% of the feed carbon dioxide, and 97% of the feed carbon monoxide and methane, where the rejection parameter is defined as the ratio of the amount of a specific component in the reformate (or high pressure) stream exiting the membrane unit over the amount of that component in the feed stream to the membrane unit; and i) the conversion of carbon monoxide in the shift reactors is 80%.

EXAMPLE 1

Integration of the CO-SER Process with CO Production Processes

Table 3 contains mass balance data for some of the process schemes for producing carbon monoxide as depicted in FIGS. 5, 6 and 8. The table provides the total moles of carbon monoxide produced as product, the number of moles of carbon monoxide produced per mole of fresh methane fed to the SMR reactor ($CO/CH_4$) and the total moles of all components fed to the SMR reactor (which is proportional to the number of tubes required in the reformer and the heat duty of the reformer).

TABLE 3*

COMPARATIVE PERFORMANCE OF INTEGRATED SERP-SMR PROCESS SCHEMES FOR PRODUCTION OF CO

| | | Net Quantity of CO Product (moles) | Total Quantity of Feed to SMR (moles) | (CO/ $CH_4$) |
|---|---|---|---|---|
| FIG. 5: | SMR + CO-VSA | 10.3 | 100.0 | 0.41 |
| FIG. 5 | SMR + CO-VSA with imported $CO_2$ as SMR feed | 31.9 | 160.0 | 1.28 |
| FIG. 6 | SMR + CO-VSA with recycled $CO_2/CH_4$ from CO-VSA waste gas as SMR feed | 20.0 | 153.3 | 0.80 |
| FIG. 8 | SMR + SERP + CO-VSA | 15.7 | 100.0 | 0.63 |
| FIG. 8 | SMR + SERP + CO-VSA with imported $CO_2$ as SERP feed | 46.2 | 100.0 | 1.85 |
| FIG. 8 | SMR + SERP + CO-VSA with recycled $CO_2/CH_4$ from CO-VSA waste gas as SMR feed | 22.8 | 154.4 | 0.91 |

*Feed to SMR: 25 moles $CH_4$ + 75 moles $H_2O$ (base case)

Data for the base case system consisting of a steam methane reformer followed by separation of carbon monoxide by a CO-VSA unit (FIG. 5) indicates that 10.3 moles/min of CO can be produced per 100 moles/min of feed to the reformer, and the $CO/CH_4$ ratio is 0.41. Applicants' process consisting of steam methane reforming, sorption enhanced reaction of CO2 and H2 to CO, and separation of carbon monoxide by a CO-VSA unit (an embodiment of Claim 1 illustrated in FIG. 8) achieves production of 15.7 moles/min of CO per 100 moles/min of feed to the reformer, and the $CO/CH_4$ ratio is 0.63. Thus, addition of the SER cycle to a the SMR process yields an unexpected 52% increase in CO production over the prior art process at the same feed rate to the SMR.

One skilled in the art of steam methane reforming would realize that the CO production can be increased by adding carbon dioxide to the feed of the steam methane reformer. Data for the system consisting of a steam methane reformer with an additional imported $CO_2$ feed followed by separation of carbon monoxide by a CO-VSA unit (FIG. 5) indicates that 31.9 moles/min of CO can be produced per 160 moles/min of feed to the reformer (100 moles/min of methane/steam mixture plus 60 moles/min carbon dioxide), and the $CO/CH_4$ ratio is 1.28. The patentee's new process consisting of steam methane reforming, sorption enhanced reaction of a mixture comprising the dried reformate stream plus a feed of pure carbon dioxide to shift $CO_2$ and $H_2$ to CO, and separation of carbon monoxide by a CO-VSA unit (an embodiment of Claim 5 illustrated in FIG. 8) achieves production of 46.2 moles/min of carbon monoxide per 100 moles/min of feed to the reformer, and the $CO/CH_4$ ratio is 1.85. Thus, addition of the SER process to the existing process yields a substantial 45% increase in CO production over the prior art process at a steam methane reformer feed rate which is only 62% of the feed rate of the prior art process. In other words, for a given total reformer feed rate (methane plus steam plus carbon dioxide), the production of CO can be enhanced by 132% by using Applicants' claimed process. Applicants' process produces 4.48 times more CO, at the same reformer feed rate, than the base case consisting of a steam methane reformer followed by separation of carbon monoxide by a CO-VSA unit (FIG. 5).

If an import stream of carbon dioxide is not available, one skilled in the art of steam methane reforming would realize that a carbon dioxide-enriched stream could be recovered from the separation system. The CO production rate of the process could then be increased by recycling this stream to the feed of the steam methane reformer. Data for the system consisting of a steam methane reformer with an additional feed of $CO_2$-enriched recycle stream followed by separation of carbon monoxide by a CO-VSA unit and formation of the $CO_2$-enriched recycle stream from the CO-depleted stream from the CO-VSA waste stream (FIG. 6) indicates that 20.0 moles/min of CO can be produced per 153.3 moles/min of feed to the reformer (100 moles/min of methane/steam mixture plus 53.3 moles/min of $CO_2$-enriched stream), and the $CO/CH_4$ ratio is 0.80.

Applicants' claimed process consisting of a steam methane reformer with an additional feed of $CO_2$-enriched recycle stream followed by performing an SER cycle to shift $CO_2$ and hydrogen in the dried reformate to CO, separation of CO by a CO-VSA unit and formation of the $CO_2$-enriched recycle stream from the CO-depleted stream from the CO-VSA waste stream (an embodiment of Claim 4 illustrated in FIG. 8) achieves production of 22.8 moles/min of carbon monoxide per 100 moles/min of feed to the reformer, and the $CO/CH_4$ ratio is 0.91. Thus, addition of the SER process to the existing process yields a significant 14% increase in CO production over the prior art process at a steam methane reformer feed rate which is only 65% of the feed rate of the prior art process. In other words, for a given total reformer feed rate (methane plus steam plus the carbon dioxide-enriched recycle stream), the production of CO can be enhanced by 75% by using the claimed process. Applicant' claimed process processes 2.21 times more CO, at only a 54% higher reformer feed rate, than the base case consisting of a steam methane reformer followed by separation of carbon monoxide by a CO-VSA unit (FIG. 5).

EXAMPLE 2

Integration of the CO-SER Process with H2 Production Processes

Figure 7:
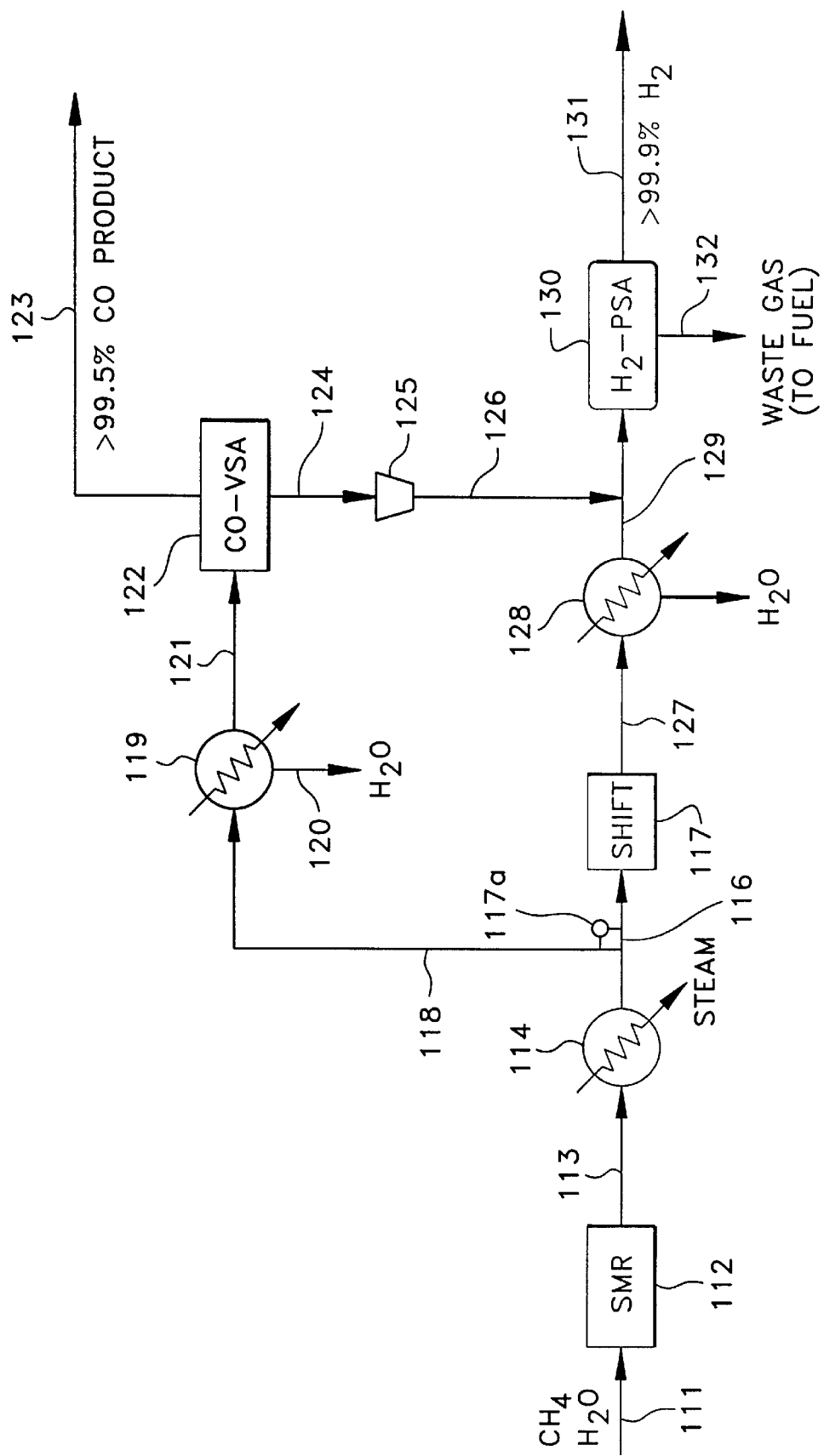
FIG. 7 illustrates a prior art SMR process wherein SMR reactor reformate is separated into a first stream which is introduced into a HTS reactor and a second stream which is introduced into a CO-VSA to yield an essentially pure CO product and a CO-depleted stream which is combined with the HTS reactor effluent and separated in a $H_2$-PSA unit to provide an essentially pure hydrogen product.

Table 4 contains mass balance data for some of the process schemes for producing hydrogen (FIG. 1) and smaller amounts of co-product carbon monoxide (FIGS. 7 and 9). The table gives the total moles of hydrogen and carbon monoxide produced as product.

TABLE 4*

COMPARATIVE PERFORMANCE OF INTEGRATED SERP-SMR PROCESS SCHEMES FOR SIMULTANEOUS PRODUCTION OF CO AND H2

Figure 1:
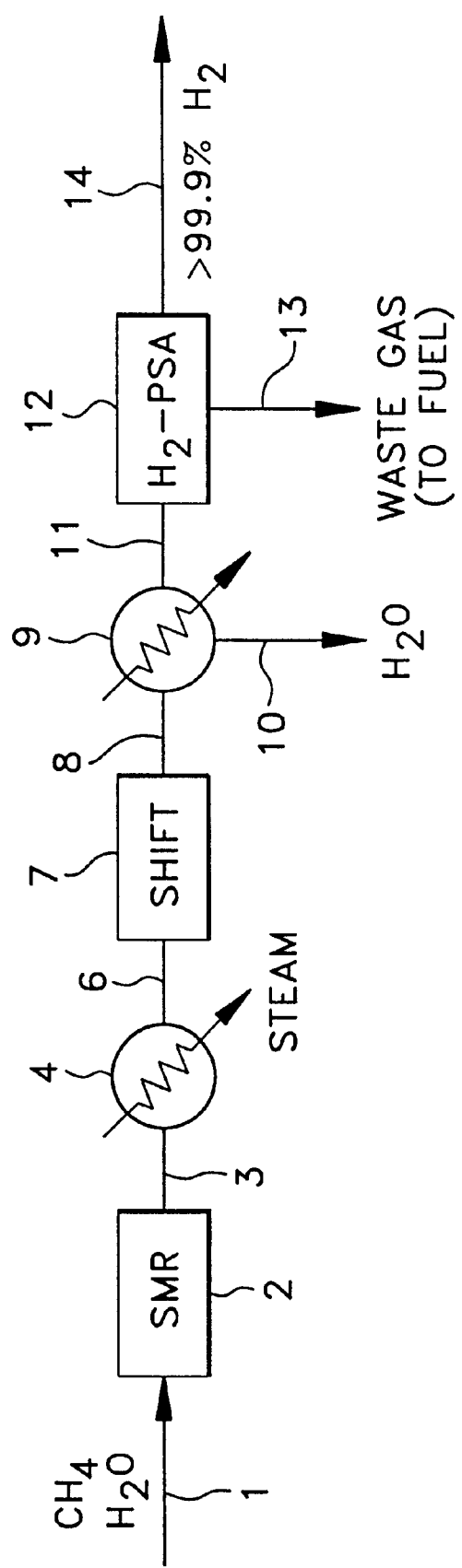
FIG. 1 illustrates a steam methane reforming (SMR) process according to U.S. Pat. No. 3,986,849 wherein SMR reactor reformate is further reacted and is separated by utilizing a high temperature shift (HTS) reactor and a hydrogen pressure swing adsorption ($H_2$- PSA) unit to provide a highly pure hydrogen product.
Figure 2:
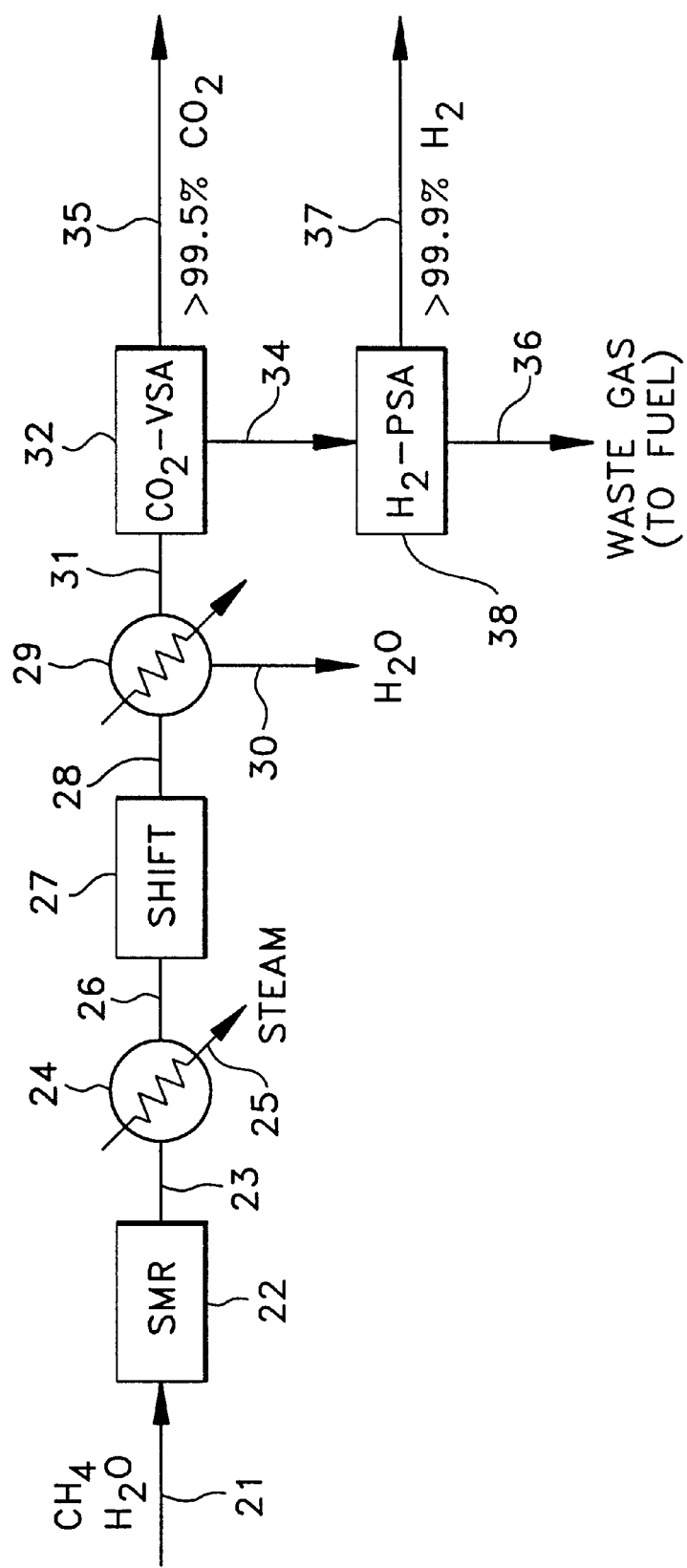
FIG. 2 illustrates a SMR process according to U.S. Pat. No. 4,171,206 wherein SMR reactor reformate is further reacted and is separated by utilizing a HTS reactor and an integration of a $CO_2$-VSA unit and a $H_2$-PSA unit to provide an essentially pure stream of carbon dioxide and an essentially pure stream of hydrogen.
Figure 3:
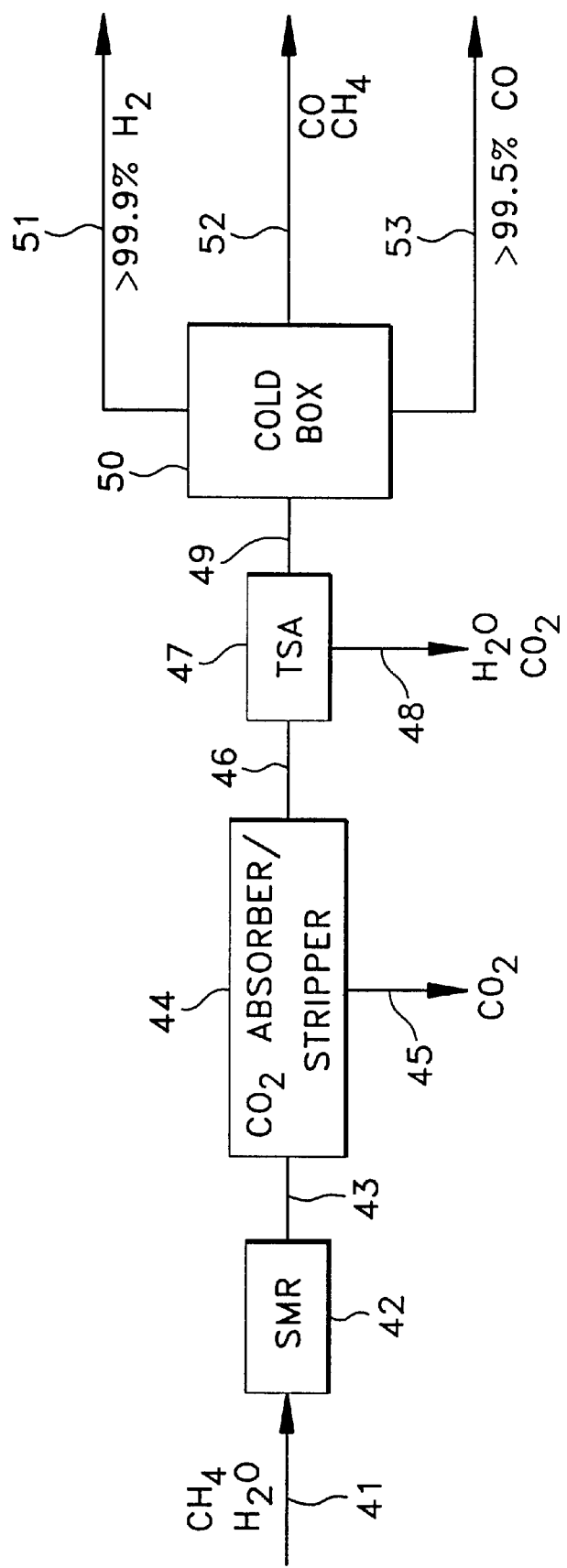
FIG. 3 illustrates a prior art SMR process which utilizes a $CO_2$ absorber/stripper to remove $CO_2$ from the reformate stream prior to introducing the reformate stream into a thermal swing adsorption (TSA) unit to further remove water and carbon dioxide prior to final separation in a cryogenic cold box to yield an essentially pure hydrogen stream, an essentially pure CO stream and a waste gas stream containing methane and CO which can be used as fuel in the reformer.
Figure 4:
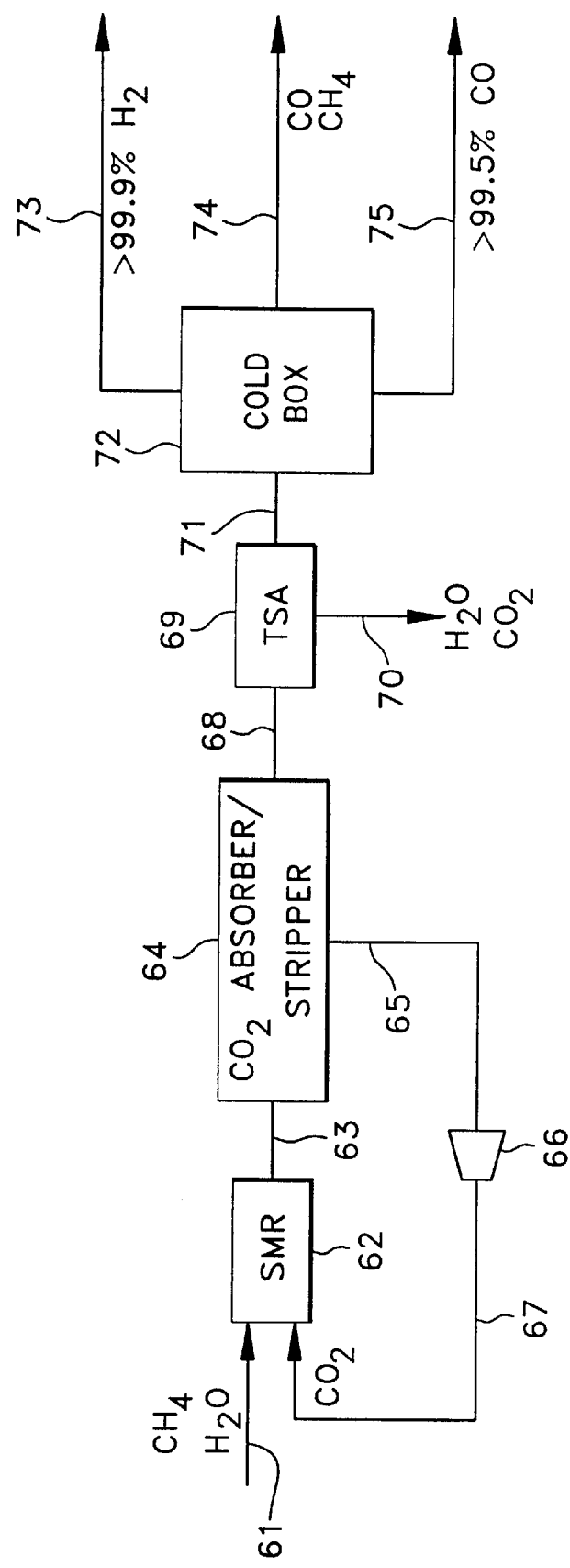
FIG. 4 illustrates a modified version of the process according to FIG. 3 wherein a $CO_2$ absorber/stripper is utilized to remove $CO_2$ from the reformate stream prior to introducing the stream into TSA unit to further remove water and $CO_2$ from the reformate. A portion of the $CO_2$ separated by the adsorber/stripper is compressed and recycled into the SMR for further conversion to hydrogen and CO.

| | | Net Quantity of H2 Product (moles) | Net Quantity of CO Product (moles) |
|---|---|---|---|
| FIG. 1: | SMR + $H_2$-PSA | 66.0 | 0 |
| FIG. 7: | SMR + $H_2$-PSA + CO-VSA | 65.2 | 1.03 |
| FIG. 9: | SMR + $H_2$-PSA + SERP + CO-VSA | 65.0 | 1.56 |

*Feed to SMR: 25 moles $CH_4$ + 75 moles $H_2O$ (base case)

Data for the base case process consisting of a steam methane reformer followed by separation of hydrogen by a $H_2$-PSA unit (FIG. 1) indicates that 66.0 moles/min of $H_2$ can be produced per 100 moles/min of feed to the reformer. One skilled in the art of steam methane reforming would realize that small amounts of co-product carbon monoxide could be produced by taking a portion of the reformate gas (referred to as the slip stream), cooling it to ambient temperature, and then separating carbon monoxide via a suitable separator.

The CO-depleted waste gas from the separator could then be recycled to the $H_2$-PSA unit for partial recovery of the remaining hydrogen. FIG. 7 illustrates a specific embodiment of this process. When 10 percent of the stream leaving condenser 114 is passed to the CO-VSA process as the slip stream (via line 118), a product stream of 1.03 moles/min of $CO_2$ is formed while the hydrogen product stream decreases to 65.2 moles/min (1.2% lower than base case) per 100 moles/min of feed to the reformer. Applicants' claimed process consisting of steam methane reforming, splitting the reformate into two streams (one of which is the slip stream), removing water from the slip streams to form a dried reformate stream, reacting this stream in a sorption enhanced reaction process to convert $CO_2$ and $H_2$ to CO, recovering the carbon monoxide in this stream with a CO-VSA unit, and finally recycling the waste gas from the CO-VSA unit to the $H_2$-PSA unit for partial recovery of remaining hydrogen (an embodiment of Claim 12 illustrated in FIG. 9) achieves production of 1.56 moles/min of carbon monoxide and 65.0 moles/min of hydrogen (1.5% lower than base case) per 100 moles/min of feed to the reformer (assuming a slip stream consisting of 10 percent of the reformate stream exiting condenser 606). Thus, addition of the SER process to the existing process yields a 51% increase in CO production over the prior art process at the same slip stream flow rate while invoking only a minor decrease (<2%) in hydrogen production rate.

Having thus described the present invention, what is now deemed appropriate for Letters Patent is set forth in the following Claims.

We claim:

1. A process for producing carbon monoxide which comprises the steps of:
   (a) reacting a feed stock comprising methane and water in the presence of a steam methane reforming catalyst at a temperature ranging from 700° C. to 1000° C. and a pressure ranging from 2 to 50 atmospheres to form a reformate comprising hydrogen, carbon monoxide, carbon dioxide and unreacted feedstock;
   (b) removing water from the reformate to form a water-depleted reformate and heating the water-depleted reformate to a temperature ranging from 200° to 500° C. to form a heated water-depleted reformate;
   (c) introducing the heated water-depleted reformate into a plurality of reactors operated isothermally in a predetermined timed sequence and according to the following steps which are performed in a cycle within each reactor:
      (1) reacting the heated water-depleted reformate at a first pressure in a first reactor containing an admixture of a water adsorbent and a water gas shift catalyst under reaction conditions sufficient to convert carbon dioxide and hydrogen to carbon monoxide and to adsorb water onto the adsorbent and withdrawing a CO-enriched stream under a relatively constant flow rate at the first pressure;
      (2) countercurrently depressurizing the first reactor to a second pressure by withdrawing a mixture comprising unreacted feedstock, carbon monoxide and water;

(3) countercurrently purging the first reactor at the second pressure with a weakly adsorbing purge fluid with respect to the adsorbent wherein the weakly adsorbing purge fluid is a fluid other than a CO-enriched fluid to desorb water from the adsorbent and withdrawing a mixture comprising unreacted feedstock, carbon monoxide and water;

(4) countercurrently purging the first reactor at the second pressure with a CO-enriched purge fluid which does not comprise hydrogen and carbon dioxide to desorb the weakly adsorbing purge fluid and withdrawing a mixture comprising the weakly adsorbing purge fluid, carbon monoxide and water; and (5) countercurrently pressurizing the first reactor from the second pressure to the first pressure with the CO-enriched purge fluid prior to commencing another process cycle within the first reactor.

2. The process of claim 1 further comprising:

(d) separating the CO-enriched stream of step c(1) to form a stream comprising CO and a CO-depleted stream.

3. The process of claim 1 further comprising the following step which is conducted between step c(1) and step c(2): countercurrently purging the first reactor at the first pressure with a weakly adsorbing purge fluid and withdrawing a mixture comprising unreacted feedstock, carbon monoxide and water.

4. The process of claim 2 further comprising separating the CO-depleted stream of step (d) to form a hydrogen-enriched waste gas stream and a hydrogen depleted, carbon dioxide enriched recycle stream and recycling at least a portion of the recycle stream for use as feedstock in step (a).

5. The process of claim 1 further comprising:

(d) introducing a source of carbon dioxide into the heated water-depleted reformate stream prior to conducting step (c).

6. The process of claim 1 wherein the admixture of the adsorbent and the catalyst comprises from 5% to 95% by weight of the adsorbent and from 95% to 5% by weight of the catalyst.

7. The process of claim 1 wherein the first pressure recited in step c (1) ranges from 2 atmospheres to 50 atmospheres and the second pressure recited in step c (2) ranges from 0 atmosphere to 2 atmospheres.

8. The process of claim 1 wherein the adsorbent recited in step c is selected from the group consisting of zeolites, alumina and silica gel and the weakly adsorbing purge fluid is selected from the group consisting of methane, hydrogen, nitrogen and carbon dioxide.

9. The process of claim 1 wherein the feedstock comprises water and methane in a stoichiometric ratio of water to methane ranging from 1.5 to 30.

10. The process of claim 1 wherein the steam-methane reforming catalyst is selected from the group consisting of nickel-alumina, nickel-magnesium alumina and noble metal catalysts.

11. The process of claim 1 wherein the water gas shift catalyst is selected from the group consisting of an iron-chromium high temperature shift catalyst, a copper/zinc oxide low temperature shift catalyst and a copper/zinc oxide medium temperature shift catalyst.

12. A process for producing carbon monoxide which comprises the steps of:

(a) reacting a feed stock comprising methane and water in the presence of a steam methane reforming catalyst at a temperature ranging from 700° C. to 1000° C. and a pressure ranging from 2 to 50 atmospheres to form a reformate comprising hydrogen, carbon monoxide, carbon dioxide and unreacted feedstock;

(b) cooling the reformate to a temperature ranging from 200° to 500° C. to form a cooled reformate and dividing the cooled reformate into a first stream and a second stream;

(c) contacting the first stream with a water gas shift catalyst under reaction conditions sufficient to form a hydrogen-enriched first stream, cooling the hydrogen-enriched first stream to form a cooled hydrogen-enriched first stream and separating the cooled hydrogen enriched first stream to form a hydrogen product stream and a hydrogen-depleted stream;

(d) removing water from the second stream to form a water-depleted second stream and heating the water-depleted second stream to a temperature ranging from 200° to 500° C. to form a heated water-depleted second stream;

(e) introducing the heated water-depleted second stream into a plurality of reactors operated isothermally in a predetermined timed sequence and according to the following steps which are performed in a cycle within each reactor:

(1) reacting the heated water-depleted second stream at a first pressure in a first reactor containing an admixture of a water adsorbent and a water gas shift catalyst under reaction conditions sufficient to convert carbon dioxide and hydrogen to carbon monoxide and to adsorb water onto the adsorbent and withdrawing a CO-enriched stream under a relatively constant flow rate at the first pressure;

(2) countercurrently depressurizing the first reactor to a second pressure by withdrawing a mixture comprising unreacted feedstock, carbon monoxide and water;

(3) countercurrently purging the first reactor at the second pressure with a weakly adsorbing purge fluid with respect to the adsorbent wherein the weakly adsorbing purge fluid is a fluid other than a CO-enriched fluid to desorb water from the adsorbent and withdrawing a mixture comprising unreacted feedstock, carbon monoxide and water;

(4) countercurrently purging the first reactor at the second pressure with a CO-enriched purge fluid which does not comprise hydrogen and carbon dioxide to desorb the weakly adsorbing purge fluid and withdrawing a mixture comprising the weakly adsorbing purge fluid, carbon monoxide and water; and (5) countercurrently pressurizing the first reactor from the second pressure to the first pressure with the CO-enriched purge fluid prior to commencing another process cycle within the first reactor; and (f) separating the CO-enriched stream of step c(1) to form a stream comprising CO and a CO-depleted stream, compressing the CO-depleted stream and combining the compressed CO-depleted stream with the cooled hydrogen enriched first stream of step c prior to separating the cooled hydrogen enriched first stream to form a hydrogen product stream and a hydrogen-depleted stream.

13. The process of claim 12 further comprising the following step which is conducted between step e(1) and step e(2): countercurrently purging the first reactor at the first pressure with a weakly adsorbing purge fluid and withdrawing a mixture comprising unreacted feedstock, carbon monoxide and water.

14. The process of claim 12 wherein the admixture of the adsorbent and the catalyst comprises from 5% to 95% by weight of the adsorbent and from 95% to 5% by weight of the catalyst.

15. The process of claim 12 wherein the first pressure recited in step e (1) ranges from 2 atmospheres to 50 atmospheres and the second pressure recited in step e (2) ranges from 0 atmosphere to 2 atmospheres.

16. The process of claim 12 wherein the adsorbent recited in step c is selected from the group consisting of zeolites, alumina and silica gel and the weakly adsorbing purge fluid is selected from the group consisting of methane, hydrogen, nitrogen and carbon dioxide.

17. The process of claim 12 wherein the feedstock comprises water and methane in a stoichiometric ratio of water to methane ranging from 1.5 to 30.

18. The process of claim 12 wherein the steam-methane reforming catalyst is selected from the group consisting of nickel-alumina, nickel-magnesium alumina and noble metal catalysts.

19. The process of claim 12 wherein the water gas shift catalyst is selected from the group consisting of an iron-chromium high temperature shift catalyst, a copper/zinc oxide low temperature shift catalyst and a copper/zinc oxide medium temperature shift catalyst.

\* \* \* \* \*